(12) United States Patent
Li et al.

(10) Patent No.: US 10,602,501 B2
(45) Date of Patent: Mar. 24, 2020

(54) JOINT ENCODING OF WIRELESS COMMUNICATION ALLOCATION INFORMATION

(71) Applicant: Intel IP Corporation, Santa Clara, CA (US)

(72) Inventors: Qinghua Li, San Ramon, CA (US); Xiaogang Chen, Portland, OR (US); Robert Stacey, Portland, OR (US); Chittabrata Ghosh, Fremont, CA (US); Yuan Zhu, Beijing (CN); Rongzhen Yang, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/957,584

(22) Filed: Apr. 19, 2018

(65) Prior Publication Data

US 2018/0242293 A1 Aug. 23, 2018

Related U.S. Application Data

(63) Continuation of application No. 14/998,211, filed on Dec. 26, 2015, now Pat. No. 9,955,469.

(Continued)

(51) Int. Cl.
*H04W 72/04* (2009.01)
*H04L 1/00* (2006.01)
(Continued)

(52) U.S. Cl.
CPC ........ *H04W 72/042* (2013.01); *H04B 7/0413* (2013.01); *H04L 1/0061* (2013.01);
(Continued)

(58) Field of Classification Search
CPC ........ H04B 7/024; H04B 7/04; H04B 7/0404; H04B 7/0413; H04B 7/0452;
(Continued)

(56) References Cited

U.S. PATENT DOCUMENTS 8,223,854 B2 7/2012 Ghosh et al.
8,775,908 B2 7/2014 Loghin et al.
(Continued)

FOREIGN PATENT DOCUMENTS

AU 2016385204 A1 * 6/2018 ........... H04L 5/0007
AU 2016385204 A2 * 6/2018 ........... H04L 5/0007
(Continued)

OTHER PUBLICATIONS

Chun et al., Uplink multi-user transmission, Nov. 11, 2013, IEEE, doc.: IEEE 11-13/1388r0 (Year: 2013).*
(Continued)

*Primary Examiner* — Eric Nowlin
(74) *Attorney, Agent, or Firm* — Eversheds Sutherland (US) LLP

(57) ABSTRACT

Methods, devices and systems for jointly encoding allocation information of one or more wireless communication stations in a common portion of a physical layer header are disclosed. In some examples, a wireless device may: generate allocation information associated with one or more wireless communication stations; encode the allocation information into the common portion of the physical layer header; and transmit the physical layer header to the one or more wireless communication stations.

17 Claims, 15 Drawing Sheets

Related U.S. Application Data

(60) Provisional application No. 62/126,302, filed on Feb. 27, 2015.

(51) Int. Cl.
  *H04L 5/00* (2006.01)
  *H04B 7/0413* (2017.01)
  *H04W 84/12* (2009.01)

(52) U.S. Cl.
  CPC .......... *H04L 1/0072* (2013.01); *H04L 1/0083* (2013.01); *H04L 5/0053* (2013.01); *H04L 5/0091* (2013.01); *H04W 72/0453* (2013.01); *H04W 84/12* (2013.01)

(58) Field of Classification Search
  CPC .. H04B 7/0613; H04B 7/0617; H04B 7/0626; H04B 7/0697; H04W 28/18; H04W 72/0413; H04W 72/042; H04W 72/12; H04W 74/06; H04W 84/12; H04W 88/08; H04L 1/0031; H04L 1/0057; H04L 1/0059; H04L 1/0071; H04L 1/0643; H04L 1/1621; H04L 1/1887; H04L 5/0007; H04L 5/0023; H04L 5/0037; H04L 5/0044; H04L 5/0053; H04L 25/0204; H04L 2001/0093; H04L 2025/03426
  See application file for complete search history.

(56) References Cited

U.S. PATENT DOCUMENTS

| | | | |
|---|---|---|---|
| 8,842,622 B2 | 9/2014 | Zhang et al. | |
| 8,897,164 B2 | 11/2014 | Yu et al. | |
| 8,989,102 B2 | 3/2015 | Kenney et al. | |
| 9,397,707 B2 * | 7/2016 | Kang | H03M 13/6527 |
| 9,596,014 B2 | 3/2017 | Yum et al. | |
| 9,742,433 B2 | 8/2017 | Lee et al. | |
| 9,794,098 B2 * | 10/2017 | Kwon | H04L 27/2601 |
| 9,800,501 B2 * | 10/2017 | Merlin | H04L 47/12 |
| 9,801,184 B2 * | 10/2017 | Noh | H04W 72/085 |
| 9,825,678 B2 * | 11/2017 | Chu | H04W 72/1289 |
| 9,955,469 B2 * | 4/2018 | Li | H04B 7/0413 |
| 9,961,678 B2 * | 5/2018 | Li | H04L 5/0023 |
| 10,021,694 B2 * | 7/2018 | Noh | H04W 72/085 |
| 10,057,854 B2 * | 8/2018 | Ghosh | H04W 4/70 |
| 10,080,227 B2 * | 9/2018 | Jung | H04W 72/0453 |
| 10,123,341 B2 * | 11/2018 | Kang | H03M 13/6527 |
| 10,165,551 B2 * | 12/2018 | Bharadwaj | H04W 72/042 |
| 10,178,670 B2 * | 1/2019 | Ghosh | H04L 5/0055 |
| 10,219,271 B1 * | 2/2019 | Hedayat | H04W 72/0446 |
| 10,257,003 B2 * | 4/2019 | Kwon | H04L 27/2601 |
| 10,270,635 B2 * | 4/2019 | Choi | H04L 5/02 |
| 10,314,058 B2 * | 6/2019 | Mori | H04J 11/00 |
| 10,327,226 B2 * | 6/2019 | Seok | H04W 72/04 |
| 10,334,475 B2 * | 6/2019 | Xi | H04L 1/1614 |
| 10,469,631 B2 * | 11/2019 | Hedayat | H04L 69/22 |
| 2005/0111345 A1 | 5/2005 | Jacobsen et al. | |
| 2008/0037540 A1 | 2/2008 | Ngo et al. | |
| 2008/0165873 A1 | 7/2008 | Ghosh et al. | |
| 2010/0054358 A1 | 3/2010 | Ko et al. | |
| 2012/0327886 A1 | 12/2012 | Yu et al. | |
| 2014/0140311 A1 | 5/2014 | Lee et al. | |
| 2014/0369276 A1 | 12/2014 | Porat et al. | |
| 2015/0009894 A1 | 1/2015 | Vermani et al. | |
| 2015/0023291 A1 | 1/2015 | Lee et al. | |
| 2015/0063258 A1 | 3/2015 | Merlin et al. | |
| 2015/0146654 A1 * | 5/2015 | Chu | H04W 72/1289 370/329 |
| 2015/0163028 A1 | 6/2015 | Tandra et al. | |
| 2015/0215017 A1 | 7/2015 | Yum et al. | |
| 2016/0081090 A1 * | 3/2016 | Jung | H04W 72/0453 370/329 |
| 2016/0087700 A1 * | 3/2016 | Chu | H04W 72/1289 370/329 |
| 2016/0150505 A1 * | 5/2016 | Hedayat | H04W 72/04 370/329 |
| 2016/0204912 A1 | 7/2016 | Sun et al. | |
| 2016/0242173 A1 * | 8/2016 | Li | H04L 5/0023 |
| 2016/0255610 A1 * | 9/2016 | Li | H04B 7/0413 370/329 |
| 2016/0316458 A1 * | 10/2016 | Kwon | H04L 27/2601 |
| 2016/0360443 A1 * | 12/2016 | Hedayat | H04B 7/0452 |
| 2016/0366644 A1 * | 12/2016 | Ghosh | H04W 52/0229 |
| 2016/0380731 A1 | 12/2016 | Kim et al. | |
| 2017/0013506 A1 | 1/2017 | Chen et al. | |
| 2017/0048823 A1 * | 2/2017 | Bharadwaj | H04W 72/042 |
| 2017/0063588 A1 | 3/2017 | Sun et al. | |
| 2017/0134043 A1 | 5/2017 | Lee et al. | |
| 2017/0188376 A1 * | 6/2017 | Noh | H04W 72/085 |
| 2017/0222769 A1 * | 8/2017 | Li | H04L 5/0023 |
| 2017/0280354 A1 | 9/2017 | Huang et al. | |
| 2017/0303268 A1 * | 10/2017 | Ghosh | H04L 5/0055 |
| 2017/0310339 A1 | 10/2017 | Lee et al. | |
| 2017/0373816 A1 * | 12/2017 | Son | H04L 5/001 |
| 2018/0006858 A1 * | 1/2018 | Kwon | H04L 27/2601 |
| 2018/0014293 A1 * | 1/2018 | Noh | H04W 72/085 |
| 2018/0014334 A1 * | 1/2018 | Ahn | H04W 84/12 |
| 2018/0020460 A1 * | 1/2018 | Hedayat | H04L 27/2602 |
| 2018/0041917 A1 * | 2/2018 | Xi | H04L 1/1614 |
| 2018/0076860 A1 * | 3/2018 | Chu | H04W 72/1289 |
| 2018/0077735 A1 * | 3/2018 | Ahn | H04L 5/0055 |
| 2018/0123656 A1 * | 5/2018 | Alpert | H04W 76/11 |
| 2018/0131553 A1 * | 5/2018 | Choi | H04L 5/02 |
| 2018/0219710 A1 * | 8/2018 | Huang | H04L 5/0007 |
| 2018/0323921 A1 * | 11/2018 | Choi | H04L 5/0025 |
| 2018/0376458 A1 * | 12/2018 | Cariou | H04W 72/04 |
| 2019/0069283 A1 * | 2/2019 | Kim | H04L 1/00 |
| 2019/0124638 A1 * | 4/2019 | Lim | H04L 1/00 |
| 2019/0199565 A1 * | 6/2019 | Kwon | H04L 27/2601 |
| 2019/0215213 A1 * | 7/2019 | Choi | H04L 1/0004 |
| 2019/0254046 A1 * | 8/2019 | Mori | H04J 11/00 |

FOREIGN PATENT DOCUMENTS

| | | | | |
|---|---|---|---|---|
| BR | 112018010588 A2 * | 11/2018 | .......... | H04L 5/0007 |
| CN | 108141304 A * | 6/2018 | .......... | H04L 5/007 |
| CN | 108476190 A * | 8/2018 | .......... | H04L 5/0007 |
| EP | 3371907 A1 * | 9/2018 | .......... | H04L 5/0007 |
| EP | 3371907 A4 * | 11/2018 | .......... | H04L 5/0007 |
| EP | 3400690 A1 * | 11/2018 | .......... | H04L 5/0007 |
| EP | 3400690 A4 * | 12/2018 | .......... | H04L 5/0007 |
| KR | 20180104285 A * | 9/2018 | .......... | H04L 5/0007 |
| MX | 2018006641 A * | 8/2018 | .......... | H04L 5/0007 |
| WO | 2014/182065 A1 | 11/2014 | | |
| WO | 2014/193547 A1 | 12/2014 | | |
| WO | WO-2017030342 A1 * | 2/2017 | .............. | H04L 1/00 |
| WO | WO-2017077682 A1 * | 5/2017 | .......... | H04L 5/0007 |
| WO | WO-2017119291 A1 * | 7/2017 | .......... | H04L 5/0007 |

OTHER PUBLICATIONS

Chun et al., Consideration on UL MU transmission, Jul. 14, 2014, IEEE, doc.: IEEE 11-14/0802r0 (Year: 2014).*
Lanante et al., Considerations on UL MU resource scheduling, Mar. 9, 2015, IEEE, doc.: IEEE 802.11-15/0377r0 (Year: 2015).*
Merlin et al., Trigger Frame Content, Nov. 9, 2015, IEEE, doc.: IEEE 802.11-15/0344r0 (Year: 2015).*
Merlin et al., Trigger Frame Content, Nov. 9, 2015, IEEE, doc.: IEEE 802.11-15/1344r1 (Year: 2015).*
Ryu et al., Trigger type specific information, Nov. 8, 2015, IEEE, doc.: IEEE 802.11-15/1345r1 (Year: 2015).*
Stacey et al., Signaling Trigger Information for STAs in 802.11ax, Nov. 9, 2015, IEEE, doc.: IEEE 802.11-15/1364r0 (Year: 2015).*
European Search Report for European application No. 16756039.0, dated Oct. 10, 2018, 9 pages.
International Search Report and Written Opinion from PCT Application No. PCT/US2016/015986, dated Jun. 16, 2016. (18 pgs.).
Josiam et al., HE-SIG-B Contents, Document No. IEEE 802.11-15/1066r0, Sep. 13, 2015, IEEE (Year: 2015).

(56) References Cited

OTHER PUBLICATIONS

Kim et al., HE-SIG-B Structure, Document No. IEEE 802.11-15/0821 r2, Jul. 11, 2015, IEEE (Year: 2015).
Seok et al., HEW PPDU Format for Supporting MIMO-OFDMA, Document No. IEEE 802.11-14/1210r1, Sep. 14, 2014, IEEE (Year: 2014).
Yunoki et al., Considerations on HE-SIG-NN, Document No. IEEE 802.11-15/827r2, Jul. 15, 2015, IEEE (Year: 2015).
Zhang et al., Preamble Structure for 11 ax System, Document No. IEEE 802.11-15/0101 r1, Jan. 2015, IEEE ,Year: 2015).

* cited by examiner

JOINT ENCODING OF WIRELESS COMMUNICATION ALLOCATION INFORMATION

CROSS REFERENCE TO RELATED APPLICATION

This application is a continuation of U.S. application Ser. No. 14/998,211, filed Dec. 26, 2015, which claims benefit and priority of U.S. Provisional Application No. 62/126,302 filed on Feb. 27, 2015, the disclosures of which are incorporated herein by reference in their entireties.

TECHNICAL FIELD

This disclosure generally relates to systems and methods for wireless communications and, more particularly, to jointly encoding bandwidth and stream allocation information of one or more wireless devices in a common portion of a physical layer header. In particular, the bandwidth and stream allocation information may include data needed by the one or more wireless communication stations to send and receive data to a base station providing access to one or more data networks (e.g., Internet).

BACKGROUND

WiFi network performance is an important factor in environments with high numbers of users (e.g., devices), such as hotspots in public venues. Efficient use of available spectrum and better management of interference in a WiFi environment may improve WiFi performance. In order to address the issue of increasing bandwidth requirements for wireless communications systems, different schemes may be employed to allow multiple user devices to communicate with a single access point by sharing the channel resources while achieving high data throughputs. Multiple Input or Multiple Output (MIMO) technology is one such scheme that has emerged for wireless communication systems. MIMO technology has been adopted in several emerging wireless communications standards such as the Institute of Electrical and Electronics Engineers (IEEE) 802.11 standard.

One way to leverage MIMO technology to improve efficient use of available spectrum and improve management of wireless interference is to reduce the number of signals (overhead), and therefore bandwidth, used by a wireless device to send data. Most wireless devices that use MIMO technology require a base station (e.g., a wireless Access Point (AP) that connects the wireless devices to the Internet). For example, one or more users (e.g., family members) may be using one or more wireless devices, to access the Internet via one or more wireless routers (base stations) within their villa. Existing MIMO technology requires each of the one or more wireless devices to request bandwidth allocation and stream allocation information from the base station. The base station in turn encodes a packet with bandwidth allocation, stream allocation, modulation coding scheme (MCS), and wireless device ID (e.g., Partial Access ID (PAID)) data. However the bandwidth allocation and stream allocation data may be encoded in the packet as many times as there are wireless devices. However this information does not need to be encoded multiple times. Not only does this increase the overhead and therefore the bandwidth needed to send allocation information (i.e., bandwidth and stream allocation information), but it also increases the chances that the information will unsuccessfully be delivered to the wireless devices. This follows because increasing the number of bits sent increases the chance (i.e., probability) that a packet may be corrupted. Successful delivery of the information is especially important in environments that are prone to wireless interference. To combat both of these potentially problematic issues, the bandwidth and stream allocation information for all wireless devices may be encoded once in a portion of a header of a physical layer frame and broadcast to all wireless devices. By encoding this information in a portion of a header of a physical layer frame, the chances that the data message will be corrupted by interference, may be decreased, and the overhead required to send bandwidth and stream allocation information to the wireless devices may decrease also. This follows because the bandwidth allocation and stream allocation data will not be encoded multiple times, but rather encoded once in a portion of a physical layer frame, and then broadcast to all of the wireless devices.

The systems and methods disclosed herein may encode bandwidth and stream allocation information into a portion of a header of a physical layer frame to decrease overhead and the number of packets (packet error rate) corrupted/dropped due to interference.

DETAILED DESCRIPTION

Figure 1:
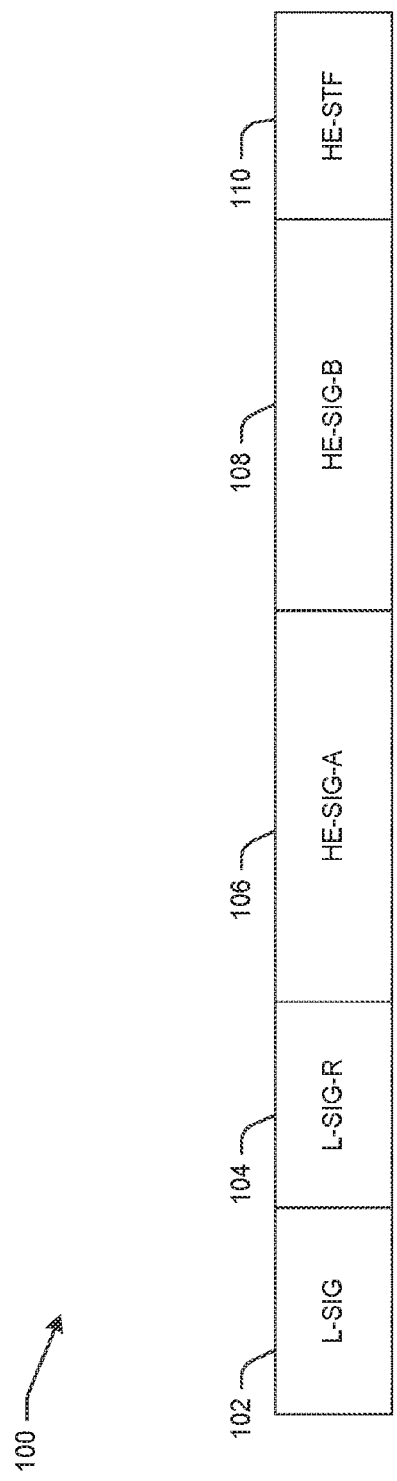
FIG. 1 depicts an illustrative example of a physical layer header, in accordance with one or more exemplary embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "communication station", "station", "handheld device", "mobile device", "wireless device," "device," "user," "user device,", and/or "user equipment" (UE) as used herein may refer to a wireless communication device such as a cellular telephone, smartphone, tablet, netbook, wireless terminal, laptop computer, a femtocell, High Data Rate (HDR) subscriber station, access point, access terminal, base station or other personal communication system (PCS) device. The device may be either mobile or stationary.

One or more example embodiments discussed herein relate to systems, methods, and devices for jointly encoding allocation information of one or more wireless communication stations in a common portion of a physical layer header. Although the present disclosure generally relates to WiFi networks, including the family of IEEE 802.11 standards (e.g., IEEE 802.11ax), other wireless networks and protocols may be employ the techniques disclosed herein.

In a wireless connection between two or more devices, a first device may communicate with a second device by sending data packets (e.g., information, a signal, binary code, and/or the like) to the second device. The data packets may be preceded by one or more preambles that may be part of one or more headers. The one or more headers may be included in a message format corresponding to one or more layers of the Open Systems Interconnection (OSI) model (e.g., a physical layer frame, a data link layer frame, a network layer packet, a transport layer segments and/or datagrams, a session layer message, a presentation layer message, and/or an application layer message.

In some embodiments, preambles may be signals and/or data packets (and/or portions of data packets) used in network communications to synchronize transmission timing between two or more devices (e.g., between the first device and the second device). Preambles may include scheduling information, address information, and/or the like to assist in directing transmission of the data packets from the first device and to the second device. Further, these preambles may enable the second device to detect a new incoming data packet from the first device. A defined length of a preamble may affect the time it takes to transmit data (e.g., data packets), which in turn may undesirably affect (e.g., increase) data packet overhead.

FIG. 1 depicts an illustrative example of a physical layer header, in accordance with one or more exemplary embodiments of the disclosure. In some embodiments, a physical layer header (e.g., a preamble of a physical layer frame) may contain the one or more data fields in example physical layer header 100 in FIG. 1. In some embodiments, and as depicted in the example physical layer header 100 of FIG. 1, the physical layer header may include a legacy signal field (L-SIG 102), a repeated L-SIG field (R-L-SIG 104), a first high efficiency signal field (HE-SIG-A 106), a second high efficiency signal field (HE-SIG-B 108), a high efficiency short training field (HE-STF 110), and/or the like. L-SIG 102 may include information about the encoding and speed with which a physical layer frame may be transmitted. R-L-SIG 104 may include the same information included L-SIG 102.

In some embodiments, an R-L-SIG may or may not be included in the physical layer header. In some embodiments, a HE-SIG-A includes information defining a total bandwidth, any common information for a cell (e.g., color bits and/or a partial cell identification (ID)), formation information about HE-SIG-B (e.g., a number of orthogonal frequency-division multiplexing (OFDM) symbols), and/or the like. HE-SIG-B may include information about scheduled users (e.g., devices such as transmitters and/or receivers of data packets or signals, and/or the like) such as bandwidth allocation, spatial stream allocation, station IDs (STAIDs), partial access IDs (PAIDs), and/or modulation coding scheme (MCS) of each scheduled user and/or device.

Beamforming or spatial filtering is a signal processing technique used in sensor arrays for directional signal transmission or reception. Beamforming may be used at both the transmitting and receiving ends of a device in order to achieve spatial selectivity in regards to channel and/or subchannel allocation. In some embodiments, beamforming may be used by the systems, methods, and devices disclosed herein to increase the gain of a received signal by constructively adding multiple spatial streams of data emitted from multiple transmit antennas on a wireless device. Beamforming requires a wireless device to transmit the same data over two or more antennas thereby increasing the overheard (power and therefore bandwidth) to transmit the data.

In addition to the overhead contributed to by beamforming, existing wireless protocols (e.g., 802.11 ac and 802.11n) require a base station to broadcast bandwidth and stream allocation information about each scheduled station, for all stations, to each wireless device that wants to access a data network (e.g., Internet). Although beamforming may increase the successful packet delivery rate of a wireless device, the requirement of broadcasting the bandwidth and stream allocation data to each wireless device requesting bandwidth and stream allocation information by the base station, may affectively increase the amount of bandwidth consumed even more. As a result, the overhead will also increase.

In order to combat this issue, an alternative approach may be to broadcast a portion of a physical layer header of a physical layer frame, containing bandwidth and stream allocation data about the base station resources to all wireless devices instead of repeatedly sending the allocation data to each station. In a second portion of the physical layer header of the physical layer frame, information about which bandwidth and stream allocation resources each wireless device may use may be included. The bandwidth and stream allocation data may contain information, unique to each wireless device that it may use to communicate with the base station. The bandwidth allocation and stream allocation data may be encoded in a portion of a second high efficiency signal field of a physical layer header in addition to partial access identification or station identification, and modulation coding scheme (MCS) information. In some embodiments, the information may be encoded using a block encoding scheme (e.g., block convolutional code (BCC) and Tail-Biting Convolutional Code (TBCC)), In other embodiments, one or more of the following error correcting codes may be used: Reed-Solomon codes, hamming codes, Hadamard codes, Expander codes, Golay codes, Reed-Muller codes, Turbo Codes, and/or Raptor codes. Most existing wireless protocols jointly encode each wireless devices bandwidth and stream allocation data using a Cyclic Redundancy Check (CRC) codes to encode the HE-SIG-B field (portion) of a physical layer header of a physical layer frame. In this disclosure, we provide details about HE-SIG-B content and present a structure that supports individual encoding.

In some embodiments, common information for all scheduled users may be encoded together for reducing overhead without reducing the reliability. Therefore, a common portion may be introduced (e.g., encoded) in an HE-SIG-B portion of a physical layer header for purposes of bandwidth allocation and/or stream allocation. Although common information can be encoded into each user's specific portion of the physical layer header that is individually encoded, individual encoding would require allocation bits for bandwidth allocation and/or stream allocation to be sent multiple times in the users' individually encoded portions, which disadvantageously increases overhead. For example, each schedule user would receive 6 allocation bits for bandwidth allocation and/or 4 bits for stream allocation when the allocation bits are sent in the individually encoded user's specific portion. In contrast, all scheduled users would share the same 8 allocation bits for bandwidth allocation and/or the same 4 bits for stream allocation when the allocation bits are sent in the common portion. As such, it can be advantageous to remove bandwidth allocation and/or stream allocation information from individually-encoded portions of a physical layer header and/or an HE-SIG-B portion of a physical layer header and instead encode bandwidth allocation and/or stream allocation information separately and send them in a common portion. The common portion may be also referred to as common field or common block field and the user specific portion may be also referred to as user-specific field or user-specific block. One user-specific field may be encoded by one channel codeword. One user-specific field may comprise one or two user-specific subfield(s) where one user-specific subfield only contains information specifically for one user.

Figure 2:
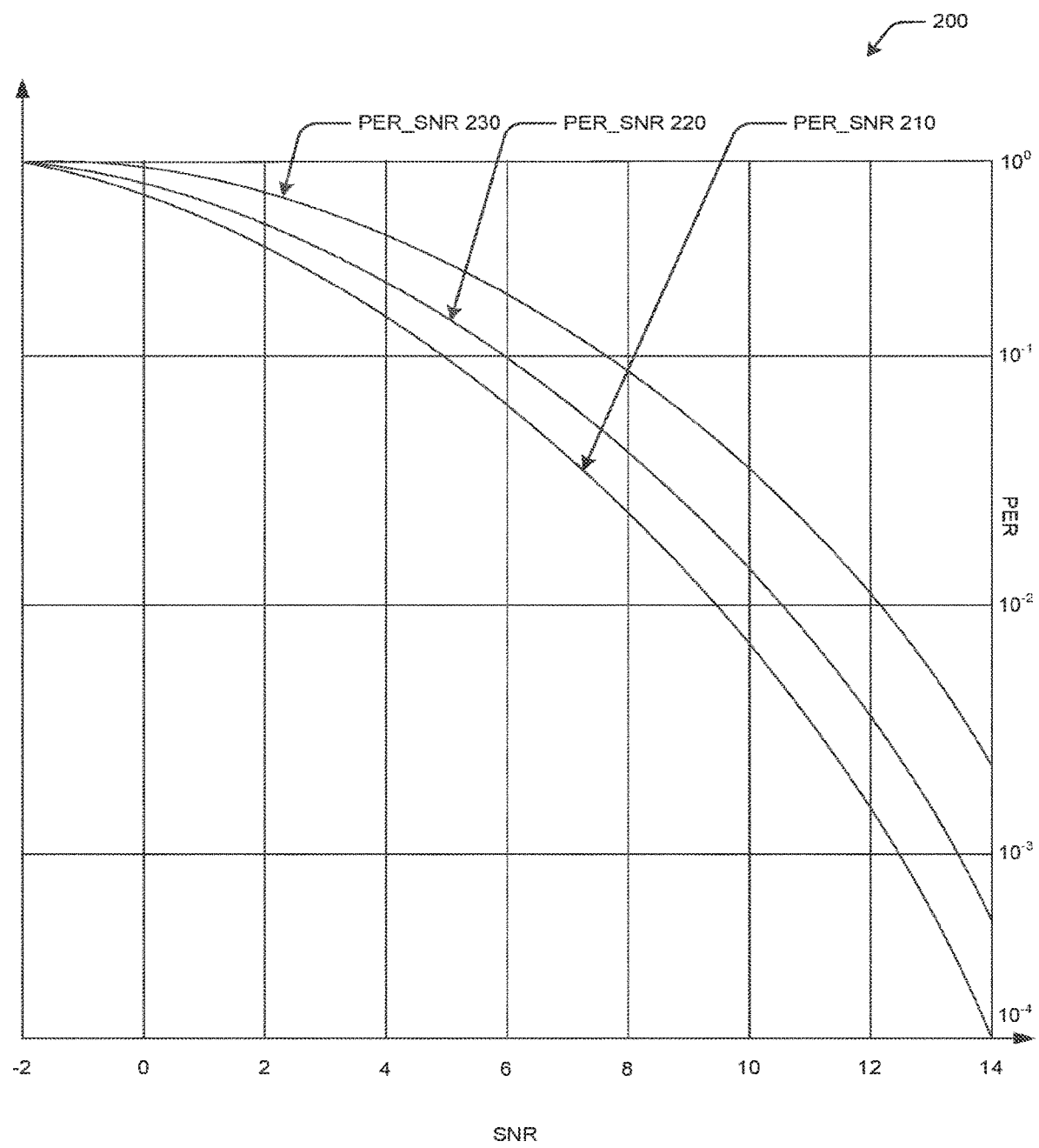
FIG. 2 depicts example results of simulating individual encoding versus joint encoding, in accordance with one or more exemplary embodiments of the disclosure.

In this manner, encoding bandwidth allocation and/or stream allocation information separately and sending the information in a common portion reduces overhead and increases reliability. FIG. 2 depicts a tradeoff 200 between the Signal-to-Noise Ratio (SNR) and Packet Error Rate (PER) of three different methods of encoding the bandwidth and stream allocation data. A first encoding method (PER_SNR 230), and a second encoding method (PER_SNR 220) relate to joint encoding, wherein all wireless device's bandwidth and stream allocation information, MCS, and ID are encoded by a channel encoder jointly.

When an encoder applies PER_SNR 230 to a source stream of data (i.e., bandwidth allocation data, stream allocation data, MCS data, and/or ID data), the encoder may encode the entire stream of data (i.e., bandwidth allocation, stream allocation, MCS, and/or ID data for all wireless devices) with a single codeword and apply a CRC at the end of the encoded stream. An encoder in a base station may receive the stream of data from one or more processors (e.g., processor(s) 1414) and/or memory (e.g., memory 1430) in a base station that may be K bytes in length, and may apply the codeword to the K bytes of data. Different portions of the data may refer to the bandwidth allocation, stream allocation, MCS, and/or ID data associated with the different wireless devices. For example, a first subfield in a HE-SIG-B field may be represented by bytes 1 through x of the stream of data, and may correspond to a first wireless device. In particular the bandwidth allocation, stream allocation, MCS, and ID data may be included in the first subfield. A second subfield in the HE-SIG-B field may be represented by the next x bytes. A third subfield in the HE-SIG-B field may be represented by the next x bytes after the second subfield. There may be as many subfields as wireless devices. The bytes used to form the subfields are equal to the total number of bytes (K) allocated to the stream of data.

When an encoder applies PER_SNR 220, the encoder may encoded each subfield and apply a CRC at the end of each subfield and an CRC at the after the last encoded byte of the stream of data.

When an encoder applies PER_SNR 210, the encoder does not encode the bandwidth allocation and stream allocation data, but rather encodes this information separate from the MCS and ID data. In particular, the bandwidth allocation data may be encoded in a first subfield, the stream allocation data may be encoded in a second subfield, and the MCS and ID associated with each wireless device may be encoded in separate subfields. The bandwidth allocation and stream allocation data form a "common portion" of the stream of data and the subfields associated with each wireless device for a "station specific part" of the stream of data. Also, PER_SNR 210 may include one CRC at the end of the encoded stream of data.

If the encoder encodes different parts of the stream of data the SNR and PER may be adjusted accordingly. For instance, if one or more processors execute computer readable medium instructions stored in a memory instructing an encoder (not shown in FIGS. 1-14) to apply PER_SNR 230 to a stream of data with a single codeword, and apply a CRC at the end of the encoded stream of data, the SNR and PER may be higher than the SNR and PER of SNR_PER 220 and SNR_PER 210. This is due to the fact that more information must be encoded when an encoder applies PER_SNR 210 to a stream of data. Similarly, the SNR and PER of PER_SNR 220 may be higher than the SNR and PER of PER_SNR 230 because more data must be encoded. The SNR of PER_SNR 230 may be lower than PER_SNR 220 and PER_SNR 210 because less data being encoded, and the PER of PER_SNR 230 may be lower because the bandwidth allocation data, stream allocation data, and the data in each subfield associated with the different wireless devices (i.e., MCS and ID of the wireless devices) may be each encoded with a codeword. In addition, a CRC may be added after the combined bandwidth and stream allocation subfields. Because the subfields associated with the different wireless devices are individually encoded by a codeword and a CRC may be masked by the ID associated with the wireless device, the PER and SNR may be less than PER_SNR 220 and PER_SNR 210. Encoding each subfield may decrease the number of packets corrupted (PER) thereby increasing reliability. Masking the CRC with the ID of the wireless device may reduce the number of bits encoded and therefore the SNR because it is masked (included in) by the bits representing the ID of the wireless device.

Figure 3:
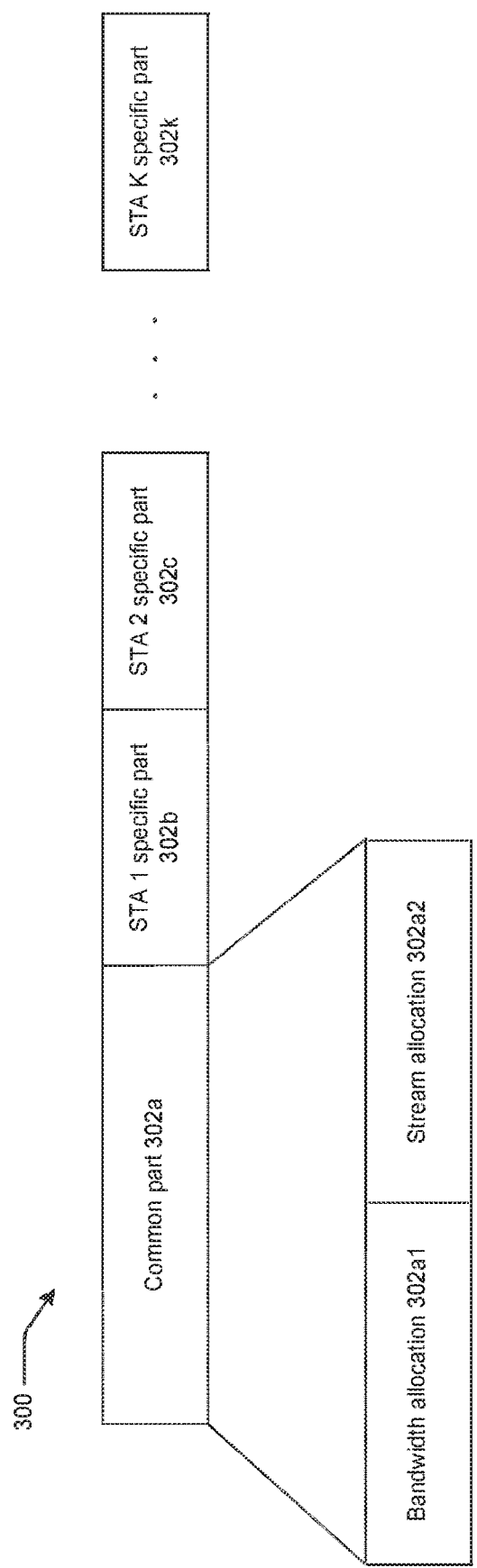
FIG. 3 depicts an example physical layer header that includes a common part, in accordance with one or more exemplary embodiments of the disclosure.

FIG. 3 depicts an common part of an HE-SIG-B portion of a physical layer header in accordance with certain example embodiments of the disclosure. The common part 302a may include the bandwidth allocation 302a1 and/or spatial stream allocation of one or more users. In some embodiments, a fixed length design for bandwidth allocation and/or stream allocation may be utilized. In other embodiments, a variable length design may be utilized. Typically, bandwidth allocation divides a frequency band into one or more subbands. The subbands may be uniform or variable in size. If there are multiple wireless stations (users) using MIMO technology (i.e., MU-MIMO), each subband may include one or more spatial streams of data packets (e.g., data, information, and/or the like) when multiple users request resource information (e.g., bandwidth allocation and stream allocation data) to be used by the users when communicating with a base station. Spatial stream allocation typically sequentially allocates spatial streams to scheduled users on each subband. In some embodiments, in operation of a channel access scheme may be used such as pure orthogonal frequency-division multiple access (OFDMA) and when it is used, only one spatial stream may be include in each subband and therefore stream allocation information is not needed. In other embodiments, an indication of a pure OFDMA mode can be encoded and/or included in a HE-SIG-A portion of a physical layer header of a physical layer frame.

A common portion may be encoded by an encoder (i.e., channel encoder) using one codeword (e.g., Tail-Biting Convolutional Codes). In some embodiments, a cyclical redundancy check (CRC) may be added to an end and/or a beginning of the common portion or another portion of a physical layer header to check the integrity of the common portion or other portions of the physical layer header. For example, the CRC may be used by a wireless device to determine if the data it receives from a base station is corrupt. For instance, if the channel between the wireless device and base station is prone to interference, the wireless device may use the CRC to determine which portions of a packet received from the base station might have been corrupted by the interference in the channel. The CRC may or may not be masked by a cell ID (e.g., color bits). Similarly, each scheduled station's (STA's) (e.g., user's) specific information (e.g. STA 1's) may be also encoded by a channel encoder separately using one codeword with a CRC. The CRC may be masked by at least a portion of a user's ID (e.g., the first 8 bits of a PAID).

Upon receipt of a frame, a scheduled station (wireless device) first may decode a common portion of a physical layer header to learn about the frequency and spatial configuration of a base station (e.g., transmitter, access point, data packet, signal, and/or the like). The scheduled station may then search the physical layer header for station-specific parts (STA 1 specific part 302b, STA 2 specific part 302c, . . . , STA K specific part 302k) sequentially until it to identifies its ID. For example, STA 2 in FIG. 3 may decode a common portion first and then may decode STA 1's station specific part to determine the ID and CRC corresponding to STA 1's station specific part. Because the ID in STA 1's station specific portion may not match STA 2's ID, STA 2 may decode STA 2's specific part (STA 2 specific part 302 c) where STA 2 may identify a matching CRC or ID. In this manner, STA 2 may determine one or more modulation coding schemes (MCSs) used in its subband and stream(s) allocated in the common portion. The length of the payload of each station specific portion may be a fixed number (e.g., 16 bits) or dynamic. In other embodiments a variable length payload may be used.

Figure 4:
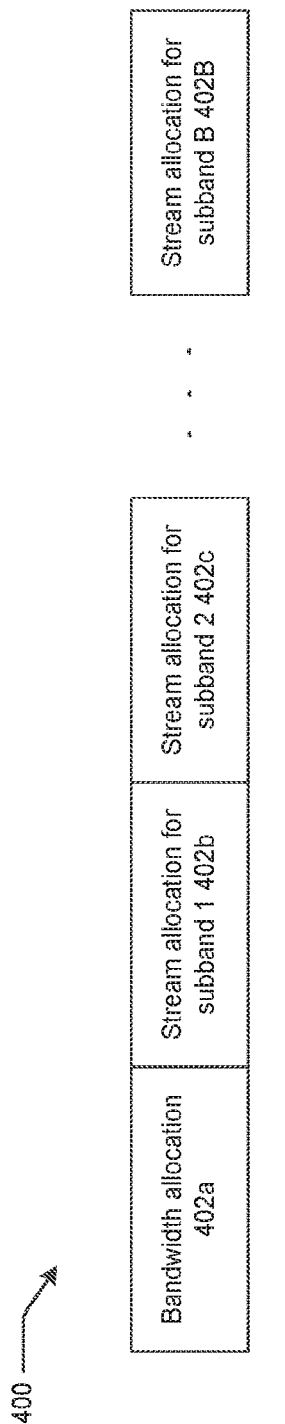
FIG. 4 depicts example content of a common part of a physical layer header, in accordance with one or more exemplary embodiments of the disclosure.

A common portion of a physical layer header may be inclusive of all scheduled users. A scheduled user may learn about (i.e., decode) a frequency band partition and spatial stream partition from a common portion of a physical layer header. Content of an example common portion is depicted in FIG. 4. In some embodiments, a bandwidth allocation portion of a common portion may be specified before or after a stream allocation $302a_2$. The bandwidth allocation portion may specify how available a band (e.g., a communication channel) may be divided into subbands with uniform and/or different sizes.

A stream allocation portion corresponding to each subband may follow the bandwidth allocation portion. The stream allocation portion may specify how each stream is allocated for each subband as specified in a bandwidth allocation portion. FIG. 4 depicts a common portion 400 of a HE-SIG-B field comprising a bandwidth allocation (i.e., bandwidth allocation 402a) and Stream allocation for subband k, where k=402a, 402b, . . . , B. Stream allocation for subband k, may include indices of one or more spatial streams that may be assigned to a subband. For example, Stream allocation for subband 1 402b may include indices that reference six spatial streams ($SS_1$, $SS_2$, . . . , $SS_6$). The same may be true for the remaining k=2, . . . , B Stream allocation for subband k subbands.

Figure 5:
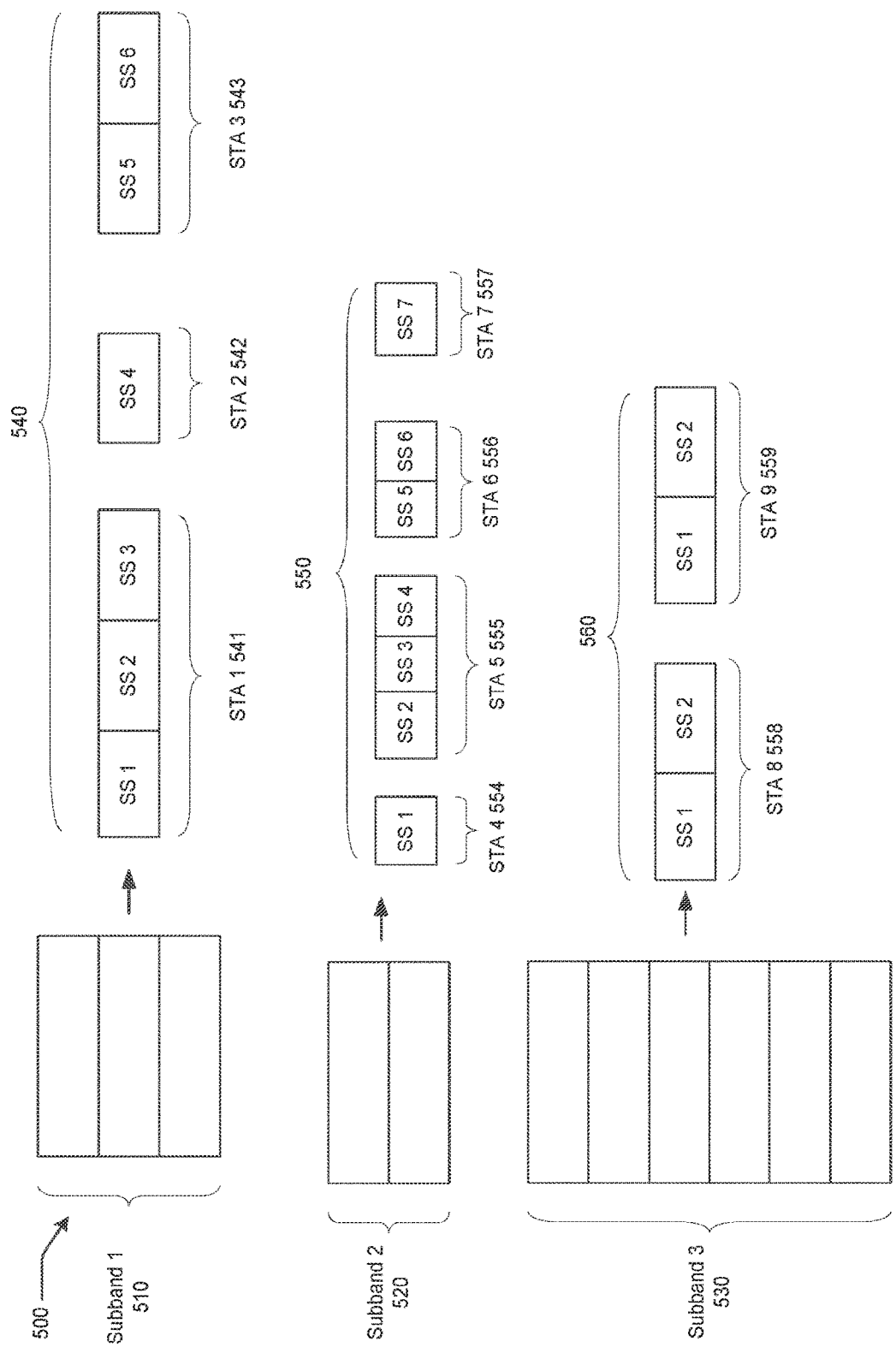
FIG. 5 depicts an example space arrangement of station-specific parts, in accordance with one or more exemplary embodiments of the disclosure.

After a common portion, one or more wireless device (station) specific parts may be arranged in a space first order as illustrated in space-frequency look up table 500 in FIG. 5. In some embodiments, a frequency first order may be used instead. In some embodiments the contents of space-frequency lookup table 500 may be mapped to the station specific parts of a HE-SIG-B field by adding an indicator, to a station specific portion of the HE-SIG-B field, to identify each scheduled wireless device's (station's) ID (e.g., Partial Access ID), and/or the Modulation Coding Scheme (MCS) associated with one or more subbbands and streams allocated to the wireless devices. The indicator may be an individual channel encoding of the station specific part of the HE-SIG-B field. For example, if there are k wireless devices requesting bandwidth and spatial stream allocation information (resource information) from a base station, a unique codeword may be generated by the base station to encode the bandwidth and spatial stream allocation information along with the PAID and MCS associated with the bandwidth and spatial stream allocation information, into the station specific part of the HE-SIG-B field. A CRC may be added to the end of each of the encoded station specific parts of the HE-SIG-B field. Each encoded station specific part of the HE-SIG-B field may be referred to as an encoded block of the HE-SIG-B field. Because the contents of the station specific part are unique to each wireless device (station), each encoded block and corresponding CRC are unique as well and the encoded block can serve as an indicator that may identify a wireless device's ID (e.g., PAID and/or MCS). In this example, a bandwidth allocation operation, as designated in a bandwidth allocation portion, cuts (e.g., splits) a band (e.g., a channel) into three subbands (subbands 510, 520, 530) with three, two, and five resource blocks or units (sub channels), respectively. As depicted, a first stream allocation (stream allocation 540) (e.g., STA 1 541, STA 2 542, STA 3 543) is a first subband (subband 510). First stream allocation 540 specifies six spatial streams sequentially allocated to three wireless devices (stations)

each of which is allocated three, one, and two streams, respectively. A second stream allocation (stream allocation 550) (e.g., STA 4 554, STA 5 555, STA 6 556, STA 7 557) for a second subband (subband 520) specifies seven spatial streams that may be sequentially allocated to four wireless devices (stations), each of which is allocated taking one, three, two, and one streams, respectively. A third stream allocation (stream allocation 560) (e.g., STA 8 558, STA 9 559) may be assigned to a third subband (subband 530) that specifies that four spatial streams may be sequentially allocated to two wireless devices (stations) each of which is allocated two streams.

In order to encode the information in space-frequency lookup table 500 in a HE-SIG-B field, the information must be mapped from space frequency lookup table 500 to station specific portions in the payload of the HE-SIG-B field. For each allocation, an indication of each scheduled station's ID e.g. PAID and its MCS may be specified with individual channel encoding and CRC. A mapping between the linearly arranged, station- (e.g., user-) specific parts and the 2D allocations. The mapping can be space first as in FIG. 5 or frequency first.

For pure OFDMA mode, the stream allocation may be skipped because there is only one spatial stream in each subband. In a pure OFDMA mode, a base station may only allocated one spatial stream per subband because one or more wireless device's station specific portions may be communicated to the wireless devices from the base station by multiplexing all of the wireless device's station specific parts using a single frequency band (subband). An indication bit may be put in HE-SIG-A or the beginning of HE-SIG-B to specify whether the stream allocation is skipped or not.

Figure 6A:
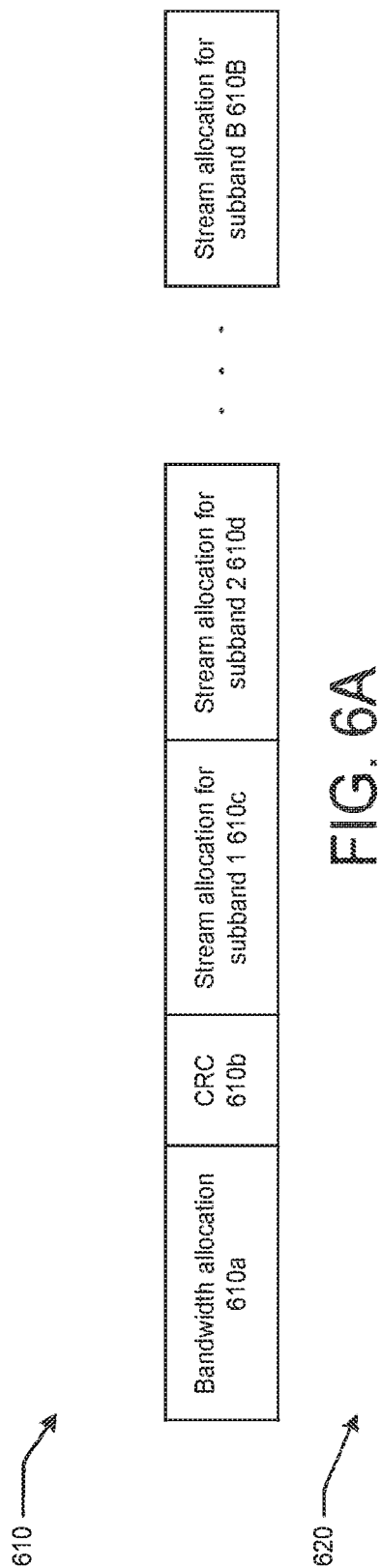
FIG. 6A depicts an example of a separate encoding for bandwidth allocation, in accordance with one or more exemplary embodiments of the disclosure.
Figure 6B:
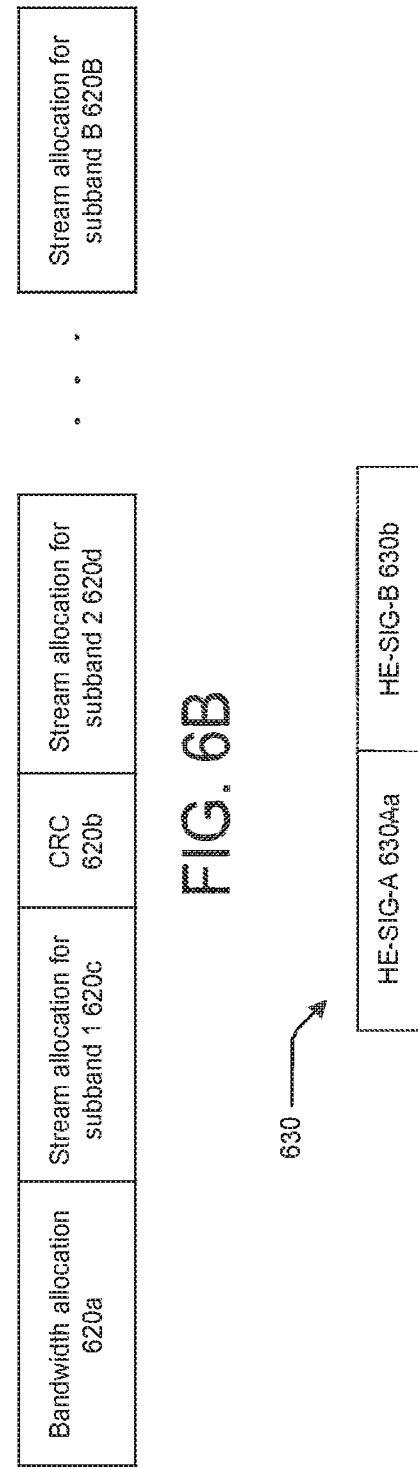
FIG. 6B depicts an example of a separate encoding for bandwidth allocation and a first stream allocation, in accordance with one or more exemplary embodiments of the disclosure.
Figure 6C:
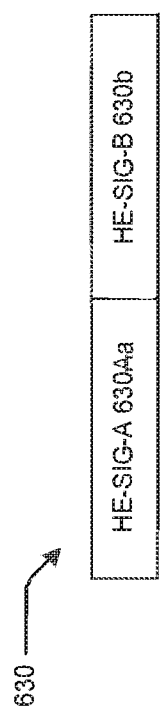
FIG. 6C depicts an example of an indication of a length of bandwidth allocation, in accordance with one or more exemplary embodiments of the disclosure.

For decoding a common portion, a receiver needs to know (e.g., identify) a payload length of the common portion such that a convolutional decoder can exploit tail bits or tail biting property and a CRC at an end of the common portion. A bandwidth allocation portion may have a fixed or dynamic length. Namely, L-1 bits may be used to indicate a bandwidth allocation portion for a subband with L resource units or blocks. For example, if there are L=2 subbands it may only be necessary to use one bit to refer to the two resource units. The length of the common part may change depending on the number of subbands indicated in the bandwidth allocation portion of the HE-SIG-B field. For example, a base station may allocate k subbands to a first group of wireless devices, where k=1, 2, 3, . . . , 1. And the same base station may allocate K subbands to a second group of wireless devices where K=1, 2, 3, . . . L, and L>1. In other words, the number of subbands allocated to the second group of wireless devices is greater than the number of subbands allocated to the first group of wireless devices. As a result the length of the common portion may be variable based on the number of subbands allocated. Because the number of allocated spatial streams are conditioned on the number of subbands available to support the request(s) of one or more wireless devices for bandwidth (resource units/ blocks) to transmit data to the base station the bandwidth allocation determines the length of the common portion. In order to ensure reliable transmission of the bandwidth allocation data, and because the number of subbands can be determined after the bandwidth allocation portion of the HE-SIG-B field, the bandwidth allocation portion may be encoded using a convolutional code followed by a CRC. A second CRC may be added to the end of the common part. This is shown in FIG. 6A-6C. In some embodiments, the first CRC is longer, shorter, and/or the same duration as the second CRC.

In FIG. 6A, a bandwidth allocation portion of a common portion 610*a* may be encoded individually with tail bits or tail biting. A CRC (CRC 610*b*) may or may not be adjacent to a bandwidth allocation portion in a physical layer header. The receiver may decode the bandwidth allocation portion, which typically has a fixed length, and may check (e.g., execute) the CRC. After the bandwidth allocation portion is decoded and bandwidth allocation information is extracted from the bandwidth allocation portion, one or more subbands included in a band and/or channel may be determined based on an analysis of bandwidth allocation information. Stream allocation for subband 1 610*c*, Stream allocation for subband 2 610*d* . . . Stream allocation for subband B 610B may contain bit strings representing indices corresponding to one or more streams that may be assigned to one or more stations.

For multiuser MIMO (MU-MIMO), a fixed length number of bits may be used to refer to each stream allocation portion (i.e., stream allocation for subband 1 . . . stream allocation for subband B). In some embodiments, the streams may be referenced according to the following scheme. For instance a base station may provide a total of M spatial streams to one or more wireless devices connected to it, but M spatial streams may be allocated to the devices in a number of different ways. Each spatial stream may be allocated in each subband depending on the needs/requirements of the wireless devices. For example, one or more users may be using a bandwidth intensive application (e.g., video streaming service such as YouTube, Vimeo, and/or Hulu) in a spatially diverse wireless environment (Multiple Input Multiple Output base station and wireless devices). And there may be other wireless devices using less bandwidth intensive applications (messaging service such as Facebook Messenger) in the same wireless environment. But because the wireless devices using bandwidth intensive applications require more resources (bandwidth), more spatial streams may be allocated to these wireless devices than the other wireless devices. The bandwidth intensive wireless devices may be assigned to different subbands, and different spatial streams may be allocated to the different bandwidth intensive wireless devise. In order for the base station to encode this information in the stream allocation portion of the HE-SIG-B field, the base station must specify which streams will be allocated to a certain subband. Returning to FIG. 5, space-frequency lookup table 500 may indicate that a base station has allocated six spatial streams to the first subband, seven spatial streams to the second subband, and four spatial streams to the third subband. Using FIG. 5 as an example STA 1 541 and STA 5 555 may be wireless devices (stations) executing more bandwidth intensive application than STA 2 542 and STA 4 554, and therefore were allocated more spatial streams. In one embodiment, M bits may be used to designate M spatial streams. For instance, in FIG. 5 if only seven spatial streams are available for use, then the M=7. The bit string may consist of 7 bits each of which may indicate if a spatial stream is allocated to a subband. For example, the stream allocation for subband 1 may be 1111110 indicating that spatial streams 1-6 should be used in subband 1. Similarly, stream allocation for subband 2 and 3 may be 1111111 and 1111000 respectively. Once M and the number of subbands B are known, a total length of the stream allocations can be calculated using M×B+CRC. In some embodiments, stream allocation information may be encoded separately in the bandwidth allocation and may include a CRC.

FIG. 6B depicts exemplary subfields of an exemplary HE-SIG-B field. Bandwidth allocation 620*a* may be subfield a of HE-SIG-B containing a bit string indicating which subbands are available for use by one or more wireless stations communicating with a base station. Stream allocation for subband 1 620b, Stream allocation for subband 2 620d, . . . . Stream allocation for subband B 620B. CRC 620c may be a cyclic redundancy check (CRC) used to check the received data for errors. When a CRC is added after the first stream allocation for subband (i.e., when CRC 620c is placed after Stream allocation for subband 1 620b), the entire bandwidth allocated to all of the subbands may be used by a single station, if there is only one station communicating with a base station. In such a case one subband may be allocated to the single station, and the entire bandwidth may be allocated to the subband. And there may only be one spatial stream allocated to the subband because there's only one wireless device communicating with the base station.

FIG. 6C depicts an exemplary HE-SIG-A and HE-SIG-B field. Since HE-SIG-A 630a may be decoded before HE-SIG-B 630b, and HE-SIG-A 630a may include a CRC (not shown), information about the length of HE-SIG-B 630b and the length of a common part in HE-SIG-B 630b may be included in HE-SIG-A 630a. In some embodiments, a number of HE-SIG-B 630b OFDM symbols and a number of subbands may be specified in HE-SIG-A 630a. As another example, a length of a common portion may be indicated in HE-SIG-A in the unit of one bit or four bits or eight bits. In this manner, an entire common portion can be encoded by one codeword instead of two since the receiver (e.g., a receiving device) is enabled to configure a length of the common portion. CRC 620c may be a cyclic redundancy check (CRC) used to check the received data for errors.

After the CRCs are included in a common portion, tail bits may be added for a convolutional code. Alternatively, for the sake of reducing overhead, tail biting convolutional code may be used such that the tail bits are not needed.

Since the signal-to-interference-plus-noise ratios (SINRs) of scheduled users (e.g., stations) can differ by 40 dB. Because channel interference may interfere with one or more portions of a physical layer frame, different station-specific portions in a physical layer header may require different levels of protection. When a common portion is required to be decoded by all wireless devices (i.e., scheduled stations), the weakest device (i.e., device with lower SINR) may require the highest protection level. For implementation simplicity, a Modulation Coding Scheme (MCS) may be uniform for the whole HE-SIG-B portion and provide different protection levels at a subcarrier mapping stage. Namely, payloads of a HE-SIG-B portion are channel encoded and quadrature amplitude modulation (QAM) symbols are generated according to a MCS specified in a HE-SIG-A portion of a physical layer header. QAM symbols are then loaded to subchannels. In some embodiments, some QAM symbols are loaded to more than one subchannel for boosting SINR and frequency diversity.

Figure 7:
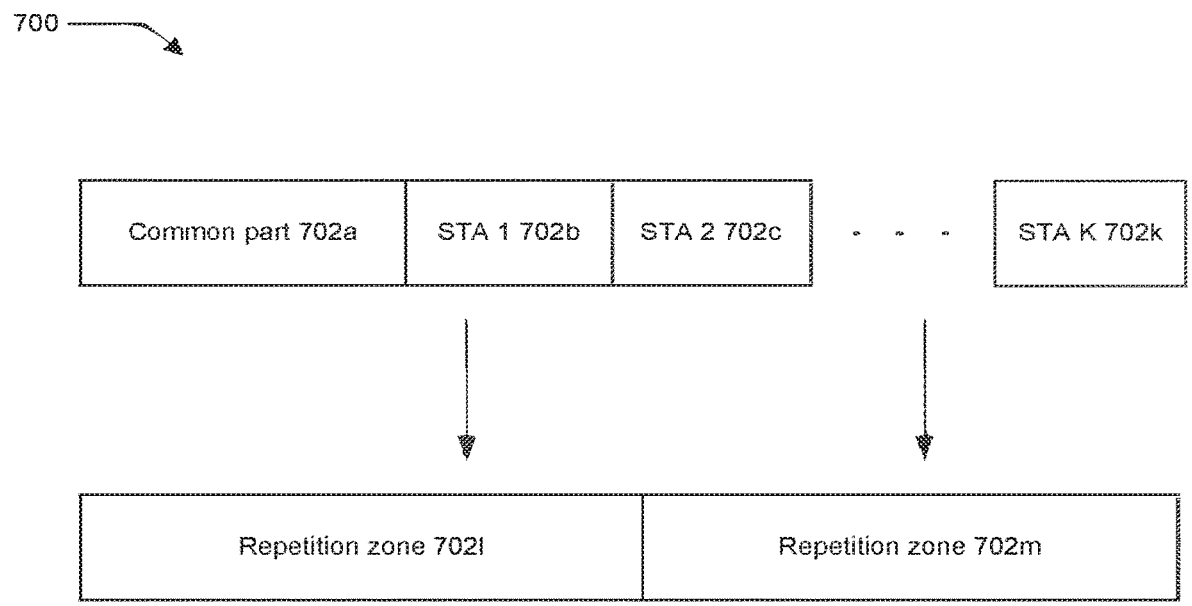
FIG. 7 depicts an example of mapping a physical layer header payload using a repetition zone, in accordance with one or more exemplary embodiments of the disclosure.

In some embodiments, OFDM symbols of HE-SIG-B of a physical layer header 700 may be divided into two or more different zones as shown in FIG. 7. OFDM symbols in a first zone may map one QAM symbol to one or more subcarriers that may be within the same OFDM symbol (e.g., MCS10 in 802.11ah) or across adjacent OFDM symbols. The second zone may not map one QAM symbol to multiple subcarriers. The zone configuration may be specified in a HE-SIG-A portion of a physical layer header. In some embodiments, a common portion and weak station-specific portions may be loaded in a repetition zone (i.e., repetition zone 7021) in FIG. 7. In this manner, executing multiple transmissions of the same signal may ensure that each portion is received by a user and/or station as required. When decoding a signal (e.g., a data packet) in repetition zone 7021, a receiver may combine signals (e.g., data packets, information, and/or the like) received on multiple subcarriers before decoding. It should be noted that a boundary in a payload (e.g., between stations' specific parts) doesn't need to be aligned with a zone boundary. Non-boundary zone 702m may include a signal that may be only transmitted once.

Figure 8:
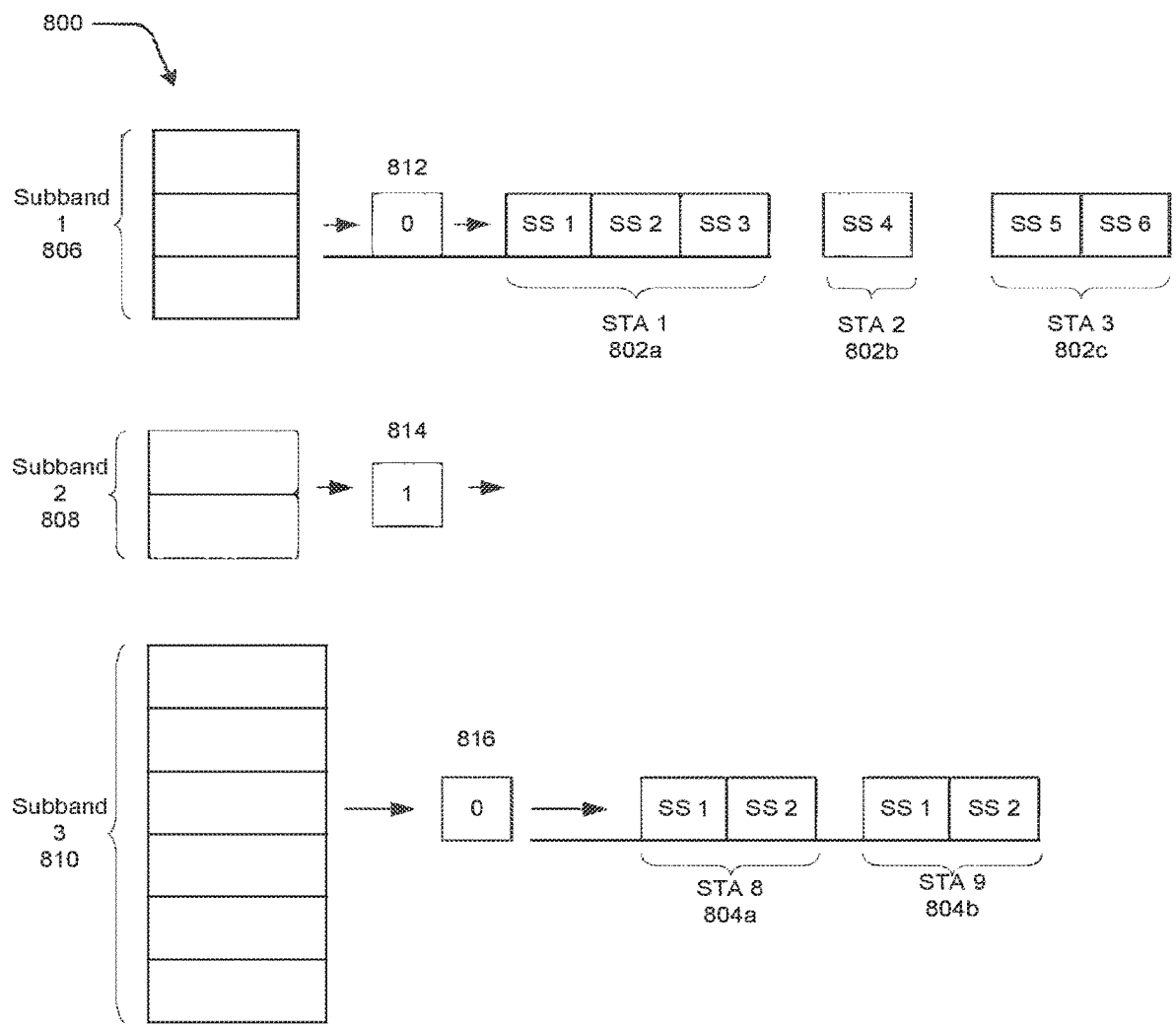
FIG. 8 depicts example indicators of bandwidth allocation for unused subbands, in accordance with one or more exemplary embodiments of the disclosure.

In some instances, a frequency bandwidth may not be fully allocated to the wireless devices (stations), communicating with a base station thereby resulting in unused and/or unallocated subbands. Two solutions may remedy this problem. A first solution is to use a special station ID in a station-specific portion of a HE-SIG-B field that corresponds to an unallocated resource (e.g., subband). The special station ID or PAID (e.g. 11 . . . 1) indicates that a wireless device (station) is a dummy wireless device (station) and the unallocated resource (e.g., subband) is not allocated to an active wireless device (station). A second solution is to include indicators in the bandwidth allocation portion of a common portion of a HE-SIG-B field as shown in FIG. 8. For example, a one-bit indicator may be used to specify whether a subband is allocated or not. For an unallocated subband, a corresponding stream allocation may not be included in the common portion of the HE-SIG-B field. In other embodiments it may be include, but ignored. Since the number of subbands varies with actual schedule, and fixed length is desirable for implementation, a fixed number of bits (e.g., M bits) may be assigned for indicating unallocated subbands in the first M subbands. To minimize overhead, the number of bits may vary according to the number of subbands. Subband 1 806, Subband 2 808, and Subband 3 810 may be subbands of a band of frequencies allocated by a base station to one or more wireless devices (stations) to access one or more data networks (i.e., connect to the Internet). Bit 812, 814, and 816 may indicate whether a subband will be allocated or not. STA 1 802a, STA 2 802b, STA 3 802c, STA 4 804a, and STA 5 804b may represent wireless devices (stations) that one or more spatial streams are assigned to. SS 1 $802a_1$, SS 2 $802a_2$, and SS 3 $802a_3$ may be spatial streams allocated to STA 1 802a. SS 4 $802b_1$ may be a spatial stream allocated to STA 2 802b. SS 5 $802c_1$ and SS 6 $802c_2$ may be spatial streams allocated to STA 3 802c. SS 1 $804a_1$ and SS 2 $804a_2$ may be assigned to STA 4 804a. SS 3 $804b_1$ and SS 4 $804b_2$ may be assigned STA 5 804b. A wireless device may indicate whether a subband will be allocated based on a single bit. For example, because bits 812 and 816 in FIG. 8 are "0", this may indicate that Subband 1 806, Subband 3 810, and corresponding spatial streams SS 1 $802a_1$, SS 2 $802a_2$, SS 3 $802a_3$, SS 4 $802b_1$, SS 5 $802c_1$, SS 6 $802c_2$, SS 1 $804a_1$, SS 2 $804a_2$, SS 3 $804b_1$, and SS 4 $804b_2$, may be allocated to one or more wireless devices. Bit 814 may be assigned a value of "1" which may indicate that Subband 2 808 will not be allocated to one or more wireless devices.

Figure 9:
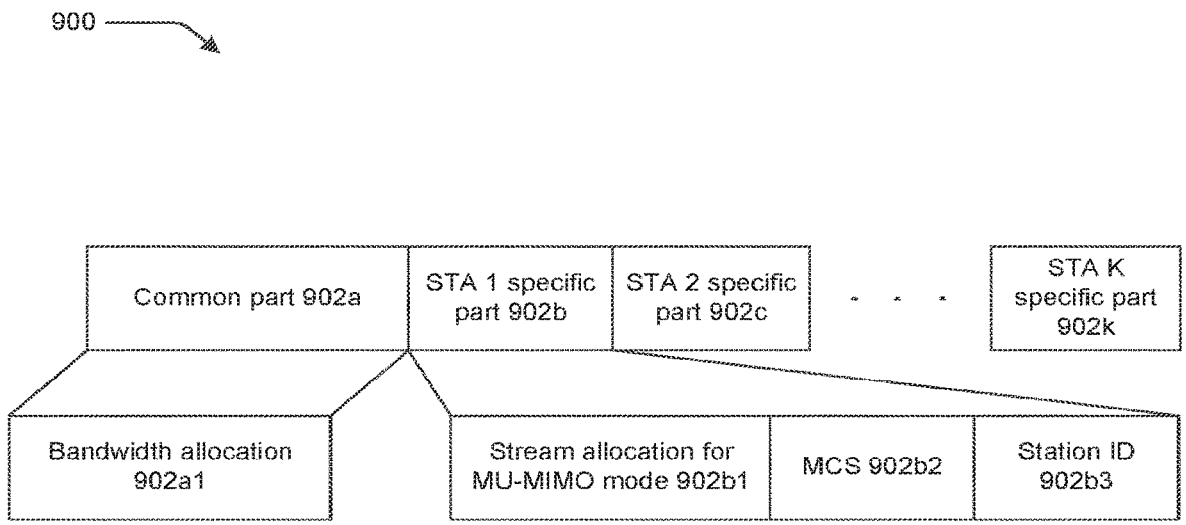
FIG. 9 depicts example distribution of allocation information into station-specific portions of a physical layer header, in accordance with one or more exemplary embodiments of the disclosure.

Since the number of stream allocations (e.g., the number of active subbands) varies with the schedule, the length of a common portion may be variable. In some embodiments, stream allocation information may be removed from a common portion and included in stream allocation information, which in turn can be included in wireless device (station) specific portions of a physical layer header 900 as shown in FIG. 9. For example, in some embodiments if a physical layer header includes up to eight spatial streams, each stream allocation may be identified by eight bits. In contrast, FIG. 9 depicts removal of eight bits and the addition of seven bits in the stream allocation information of each wireless device's (e.g., station's) specific portion. A calculation of the seven bits is explained in more detail below. Common part 902a may include bandwidth allocation $902a_1$. Bandwidth allocation $902a_1$ may be a subfield of a HE-SIG-B field including information about one or more subbands that may be allocated to one or more wireless devices (stations). Each station specific part (i.e., STA 1 specific part 902b ... STA K specific part 902k) may include three subfields. A first subfield, Stream allocation for MU-MIMO mode $902b_1$, may include information about which streams may be allocated to a plurality of wireless devices when a multiuser MIMO (MU-MIMO) mode is used by a base station and the plurality of devices. A second subfield, Modulation Coding Scheme (MCS $902b_2$), may be a field indicating what modulation coding scheme is used for a particular subband and stream allocated to the subband. Station ID $902b_3$ may be a Partial Access ID (PAID) associated with a wireless device (station). The same subfields may be included in STA 1 specific part 902b ... STA K specific part 902k.

Removing the stream allocation information from the common portion may result in the common portion having a fixed length. The common portion may include bandwidth allocation information only, or other information. The bandwidth allocation information may vary based on a total bandwidth that is specified before a HE-SIG-B portion (e.g., in HE-SIG-A) of a physical layer header. Besides bandwidth allocation information, a common portion may include a maximum number of spatial streams among all subbands. This maximum number of subbands determines a number of channel training symbols denoted by high efficiency long training field (HE-LTF) symbols, which, in some embodiments, may be included in a physical layer header before and/or after a HE-STF portion. For up to nine antennas, three bits may be used for specifying a determined maximum stream number. If the maximum stream number is specified in the common portion, the required number of bits for stream allocation information inside the station-specific part can be reduced (e.g., may decrease from seven bits down to six bits or less).

A decoder may decode the stream allocation portions and/or information in a common portion, and may identify where the codeword of the common portion ends such that the decoder can utilize the tail bits or tail biting property for correcting errors in the transmission of the common portion.

Each of the above mentioned schemes have a common portion. For simplicity, a common portion in a HE-SIG-B field may be removed to reduce overhead. In this case, a wireless device (station) specific portion needs to be self-contained. The wireless device (station) specific portion may include information about bandwidth allocation and/or stream allocation for locating its resource (e.g., subband) as shown in a physical layer header 1000 of FIG. 10. Each scheduled station may include its own wireless device (station) specific portion.

The bandwidth allocation information and/or portion indicates which frequency subband is allocated to each wireless device (station). In some embodiments each subband may consist of contiguous resource units or blocks (e.g., adjacent subbands) of an entire band of frequencies may be utilized in order to increase efficiency.

There are many ways to indicate which frequency subbands are allocated. For example, an index can be assigned to each combination of subband allocations. In some embodiments, a bandwidth allocation portion and/or information may include a beginning (or center) index of a resource unit or block (e.g., frequency) of the subband. To clarify, a band (e.g., a channel) and/or a subband may be divided into resource units or blocks with the same or different sizes. As such, resource units (RUs) or blocks (RBs) may be indexed. A beginning (or center) unit or block may be specified in a wireless device (station) specific portion followed by an allocation size. The allocation size may include a number of resource units or blocks allocated to each user and/or station. For example, three bits may be used for signaling the allocation size. The three bits can specify eight different sizes, which don't need to be contiguous. The sizes may be like 1, 2, 4, 8, 16, 32 instead of 1, 2, 3, 4, 5, 6, 7. For example bit stream 000 may represent size 1, bit stream 001 may represent size 2, bit stream 010 may represent size 4 . . . bit stream 111 may represent size 32.

An indicator of null allocation indicates whether a subband is actually allocated to a wireless devices (stations) or skipped in the allocation. The indicator may be one bit. For example, there may be 9 RUs for 20 MHz band. STA 2 is allocated RUs 2, 3, 4, and 5. The corresponding bandwidth allocation bit string may be [0010, 011, 0]. The RU index corresponding to the first RU allocated to STA 1 may be 0010 which is equal to the number 2. The allocation size may be indicated by the bit string 011 which may correspond to the third allocation size in a list of different allocation sizes (e.g., 1, 2, 4, 8, 16, and 32). The non-null allocation may be identified by a zero as the last bit in the bit string. In some embodiments a non-null allocation (i.e., one or more spatial streams are allocated to a wireless device in a subband) may be indicated by a "0". In other embodiments a non-null allocation may be indicated by a "1". For pure OFDMA mode, there is only one spatial stream. The stream allocation can be skipped. The pure OFDMA mode may be indicated in a HE-SIG-A portion of the physical layer header.

Stream allocation information for MU-MIMO may include in a stream allocation portion and/or another portion of a physical layer header information specifying which spatial streams are allocated to each station, because station ID may be included in the frame all data in the frame refers to that station. Spatial streams may be indexed and the indices of the spatial stream(s) allocated to the station are specified in stream allocation information. For reducing overhead without performance degradation, a constraint that the stream indexes for the scheduled station have to be contiguous may be utilized. Besides an allocated stream index, a maximum number of streams across the band may be determined and/or indicated to the scheduled station. In this manner, the maximum number may be used to determine a number of high efficiency long training field (HE-LTF) symbols after HE-STF. In some embodiments, an efficient way is to assign an index to each combination of beginning stream indices, number of allocated streams, the maximum number of the streams for the band, and/or the like. For up to eight streams, there may be one-hundred and twenty combinations and seven bits are enough for indicating all of them. One or more CRCs may be masked by part of the station ID (e.g. PAID). Further, tail bits may not be needed if tail biting convolutional code is applied.

Figure 10:
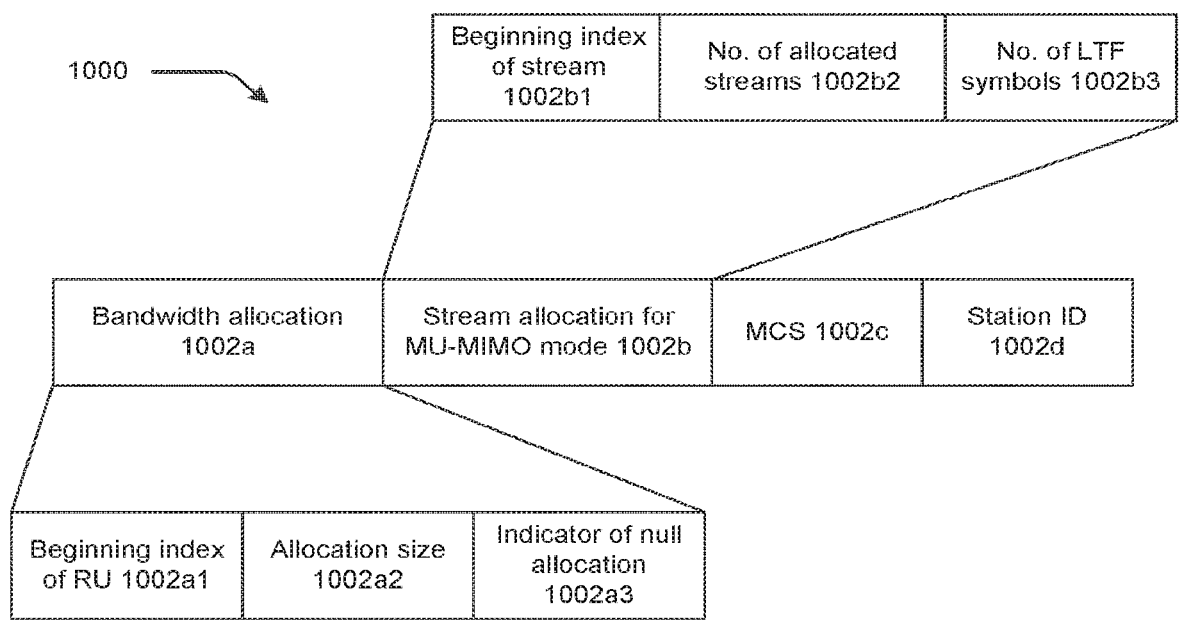
FIG. 10 depicts an example station-specific physical layer header, in accordance with one or more exemplary embodiments of the disclosure.

FIG. 10 may be an exemplary HE-SIG-B field and subfields corresponding to bandwidth allocation and stream allocation data. HE-SIG-B field may contain subfield bandwidth allocation 1002a may contain subfields Beginning index of RU $1002a_1$, Allocation size $1002a_2$, and Indicator of null allocation $1002a_3$. Beginning index of RU $1002a_1$ may be an index corresponding to the beginning index of a resource unit. Allocation size $1002a_2$ may be a bit string indicating the size (number) of resource units in a subband. Indicator of null allocation may be a single bit indicating whether a subband is allocated to one or more streams. Stream allocation for MU-MIMO mode $1002b$ may contain three subfields. Beginning index of stream $1002b_1$ may be a bit string indicating the beginning index of the one or more streams assigned to a wireless device (station) specified by Station ID $1002d$. Station ID $1002d$ may be a PAID assigned to the wireless device. No. of allocated stream $1002b_2$ may be a bit string indicating the number of spatial streams allocated to a wireless device (station) specified by the bit string in Station ID $1002d$. No. of LTF symbols $1002b_3$ may be the number of long training field symbols. MCS $1002c$ may be the modulation coding scheme that may be used by a wireless device when sending data to a wireless device on a certain subband and stream. In some embodiments, allocation information associated with each stream of data packets and included in a common portion of a physical layer header may be encoded using the same and/or different encoding techniques. Additionally, one or more codewords, keys, encryption maps, and/or the like may be utilized for security purposes.

In some embodiments, one or more portions of the physical layer header may be analyzed and/or checked for error based on one or more CRCs. An error check may include determining and/or identifying an error. Upon detection of an error, an entire signal and/or a portion determined to have an error may be retransmitted or rescheduled for transmission.

As disclosed herein, bandwidth allocation information and/or stream allocation information may be encoded in a common portion of a physical layer header. Additionally, bandwidth allocation information and/or stream allocation information may be encoded in an individual header for each subband, or encoded in one or more station- (e.g., user-) specific portions.

Figure 11:
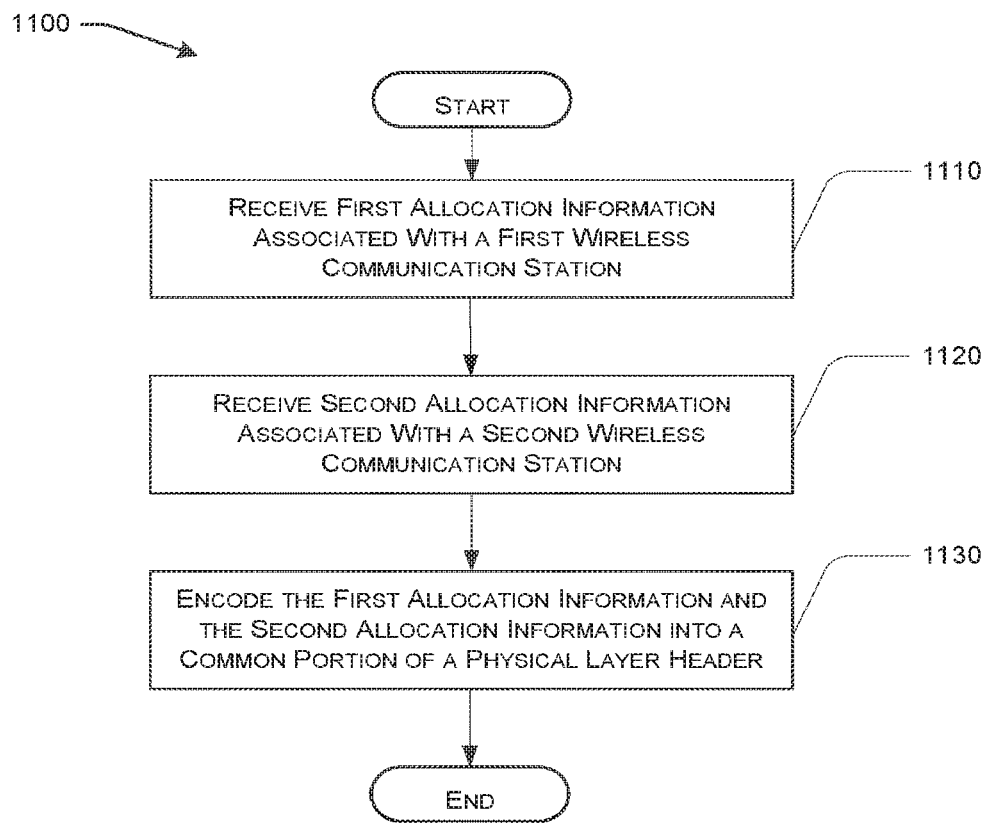
FIG. 11 depicts an example process flow for jointly encoding allocation information of one or more wireless communication stations in a common portion of a physical layer header, in accordance with one or more exemplary embodiments of the disclosure.

FIG. 11 is an example process flow 1100 for jointly encoding allocation information of one or more wireless communication stations in a common portion of a physical layer header, in accordance with one or more embodiments of the disclosure. At block 1110, the process includes receiving first allocation information associated with a first wireless communication station. At block 1120, the process includes receiving second allocation information associated with a second wireless communication station. At block 1130, the process includes encoding the first allocation information and the second allocation information into a common portion of a physical layer header.

Figure 12:
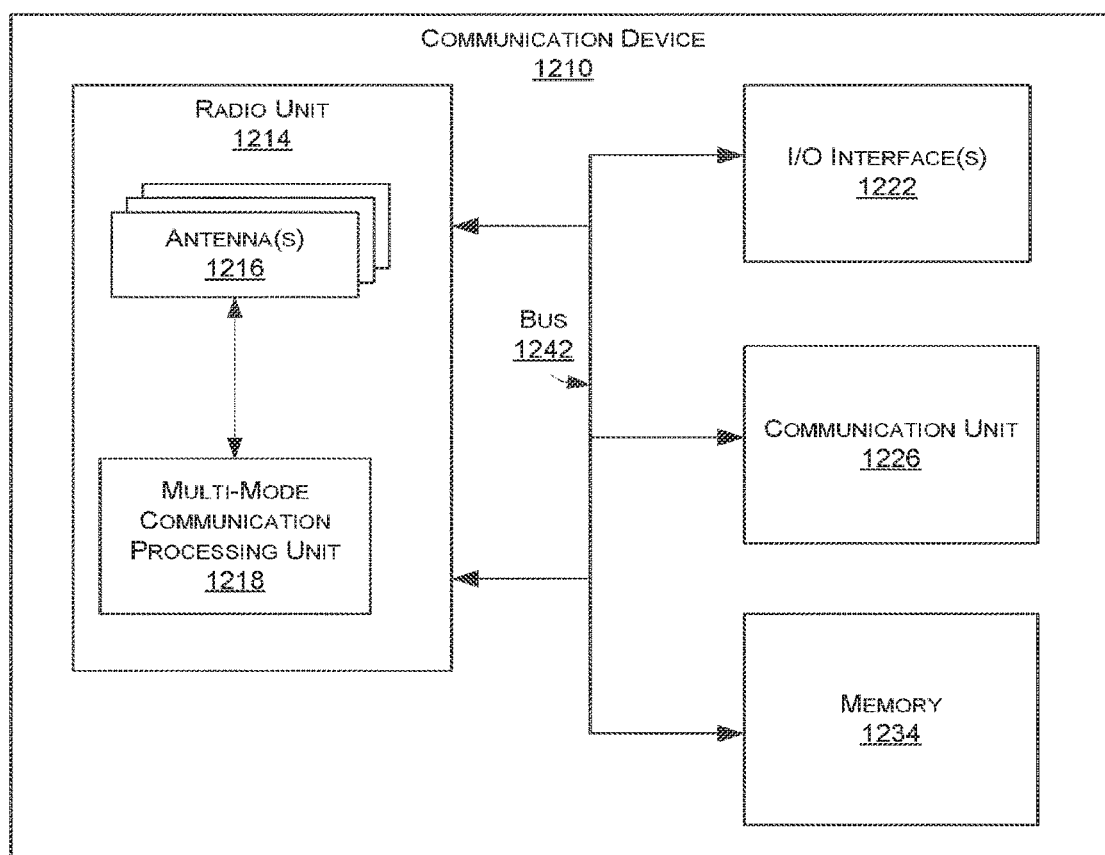
FIG. 12 depicts an example of a communication device in accordance with one or more exemplary embodiments of the disclosure.
Figure 13:
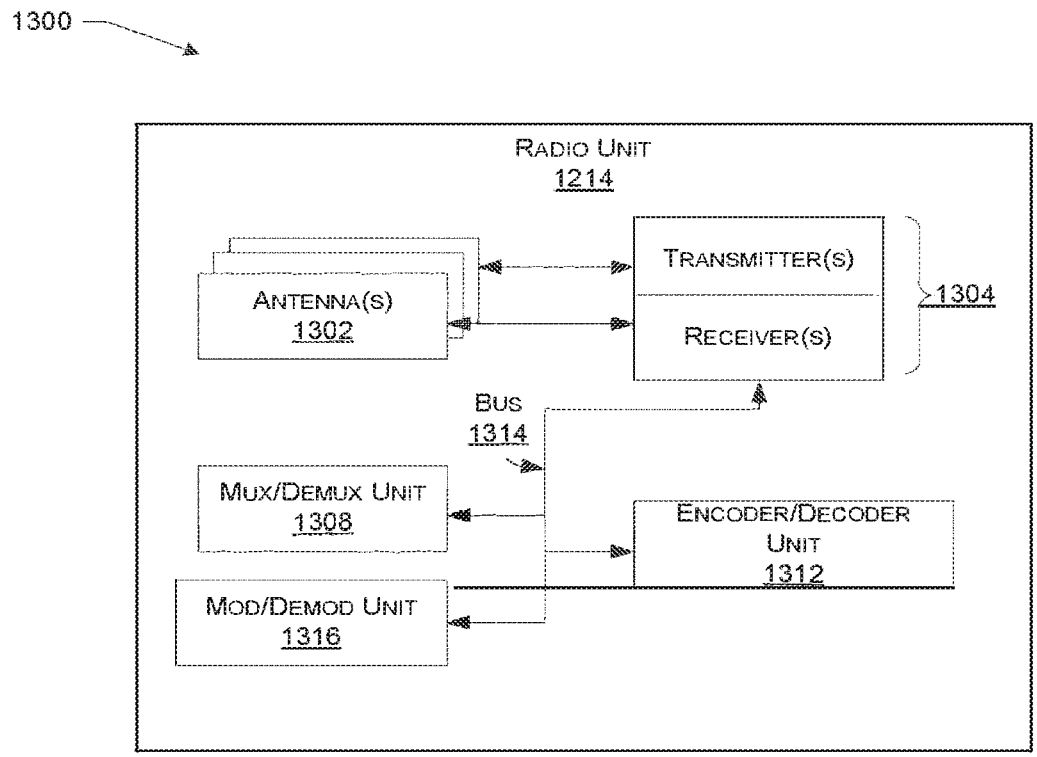
FIG. 13 depicts an example of a radio unit in accordance with one or more exemplary embodiments of the disclosure.

FIG. 12 illustrates a block-diagram of an example embodiment 1200 of a computing device (computing device 1210) that may operate in accordance with at least certain aspects of the disclosure. In one aspect, computing device 1210 may be an access point, a mobile computing device, a receiving and/or transmitting station, and/or other types of communication devices that may transmit and/or receive wireless communications in accordance with this disclosure. To permit wireless communication, including joint encoding techniques as described herein, computing device 1210 includes radio unit 1214 and communication unit 1226. In certain implementations, communication unit 1226 can generate data packets or other types of information blocks via a network stack, for example, and can convey the packets or other types of information to radio unit 1214 for wireless communication. In one embodiment, a network stack (not shown) can be embodied in or can constitute a library or other types of programming modules, and communication unit 1226 can execute the network stack in order to generate a packet or other types of information. Generation of the packet or information may include, for example, generation of control information (e.g., checksum data, communication address(es)), traffic information (e.g., payload data), scheduling information (e.g., station information, allocation information, and/or the like), and/or formatting of such information into a specific packet header and/or preamble.

Radio unit 1214 may include one or more antennas 1216 and multi-mode communication processing unit 1218. In certain embodiments, antenna(s) 1216 may be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of antenna(s) 1216 may be physically separated to leverage spatial diversity and related different channel characteristics associated with such diversity. In addition or in other embodiments, multi-mode communication processing unit 1218 that may process at least wireless signals in accordance with one or more radio technology protocols and/or modes (such as MIMO, single-input-multiple-output (SIMO), multiple-input-single-output (MISO), multiple user multiple-input-multiple-output (MU-MIMO), and/or any other. Each of such protocol(s) may be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like. Multi-mode communication processing unit 1218 also may process non-wireless signals (analog, digital, a combination thereof, or the like). In one embodiment, e.g., example embodiment 1300 shown in FIG. 13, multi-mode communication processing unit 1218 can comprise antenna(s) 1302, transmitters/receivers 1304, amplifiers, filters, analog-to-digital (A/D) converters, etc. (not shown), functionally coupled to multiplexer/demultiplexer (mux/demux) unit 1308, modulator/demodulator (mod/demod) unit 1316 (also referred to as modem 1316), and encoder/decoder unit 1312 (also referred to as codec 1312). Each of the transmitter(s)/receiver(s) may form respective transceiver(s) that transmit and receive wireless signal (e.g., streams, electromagnetic radiation) via antennas 1216. It should be appreciated that in other embodiments, multi-mode communication processing unit 1218 may include other functional elements, such as one or more sensors, a sensor hub, an offload engine or unit, a combination thereof, or the like.

Electronic components and associated circuitry, such as mux/demux unit 1308, codec 1312, and modem 1316 may permit or facilitate processing and manipulation, e.g., coding/decoding, deciphering, and/or modulation/demodulation, of signal(s) received by computing device 1210 and signal(s) to be transmitted by computing device 1210. In one aspect, as described herein, received and transmitted wireless signals may be modulated and/or coded, or otherwise processed, in accordance with one or more radio technology protocols. Such radio technology protocol(s) may include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including transmitters/receivers 1304, may exchange information (e.g., data packets, comprising allocation information, metadata, code instructions, signaling and related payload data, combinations thereof, or the like) through bus 1314, which may embody or comprise at least one of a system bus, an address bus, a data bus, a message bus, a reference link or interface, a combination thereof, or the like. Each of receivers/transmitters 1304 may convert one or more signals from analog to digital and vice versa. In addition or in the alternative, receiver(s)/transmitter(s) 1304 may divide a single data stream into multiple parallel data streams, or perform the reciprocal operation. Such operations may be conducted as part of various multiplexing schemes. As illustrated, mux/demux unit 1308 is functionally coupled to receivers/transmitters 1304 and may permit processing of signals in time and frequency. In one aspect, mux/demux unit 1308 may multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, mux/demux unit 1308 may scramble and spread information (e.g., codes) according to one or more codes including, but not limited to Hadamard-Walsh codes, Baker codes, Kasami codes, polyphase codes, and the like. Modem 1316 may modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that may be included in computing device 1210 (e.g., processor(s) included in radio unit 1214 or other functional element(s) of computing device 1210) may permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

Codec 1312 may operate on information (e.g., data, metadata, signaling, or a combination thereof) in accordance with one or more coding/decoding schemes suitable for communication, at least in part, through the one or more transceivers formed from respective transmitter(s)/receiver(s) 1304. In one aspect, such coding/decoding schemes, or related procedure(s), may be retained as a group of one or more computer-accessible instructions (computer-readable instructions, computer-executable instructions, or a combination thereof) in memory devices 1234. In a scenario in which wireless communication among computing device 1210 and another computing device (e.g., an access point, a user device, a station and/or other types of user equipment) utilizes MU-MIMO, MIMO, MISO, SIMO, or SISO operation, codec 1312 may implement at least one of space-time block coding (STBC) and associated decoding, or space-frequency block (SFBC) coding and associated decoding. In addition or in the alternative, codec 1312 may extract information from data streams coded in accordance with other spatial multiplexing schemes. In one aspect, to decode received information (e.g., data, metadata, signaling, or a combination thereof), codec 1312 may implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. Codec 1312 may utilize, at least in part, mux/demux component 1308 and mod/demod component 1316 to operate in accordance with aspects described herein.

Computing device 1210 may operate in a variety of wireless environments having wireless signals conveyed in different electromagnetic radiation (EM) frequency bands and/or subbands. As such, multi-mode communication processing unit 1218 in accordance with other aspects of the disclosure may process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands may include (i) one or more licensed EM frequency bands, (such as the industrial, scientific, and medical (ISM) bands, including the 2.4 GHz band or the 5 GHz bands); or (ii) one or more unlicensed frequency bands (such as the 60 GHz band) currently available for telecommunication.

Computing device 1210 may receive and/or transmit information encoded and/or modulated or otherwise processed in accordance with aspects of the present disclosure. As such, in certain embodiments, computing device 1210 can acquire or otherwise access information, wirelessly via radio unit 1214, where at least a portion of such information can be encoded and/or modulated in accordance with aspects described herein. More specifically, for example, the information can include data packets and/or physical layer headers (e.g., preambles and included information such as allocation information) in accordance with embodiments of the disclosure, such as those shown in FIGS. 1A-10.

Memory 1234 may contain one or more memory elements having information suitable for processing information received according to a predetermined communication protocol (e.g., IEEE 802.11ac or IEEE 802.11ax). While not shown, in certain embodiments, one or more memory elements of memory 1234 may include computer-accessible instructions that may be executed by one or more of the functional elements of computing device 1210 in order to implement at least some of the functionality for auto-detection described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of computing device 1210 for implementation of such functionality.

In addition, in illustrated computing device 1200, bus architecture 1242 (also referred to as bus 1242) may permit the exchange of information (e.g., data, metadata, and/or signaling) between two or more of (i) radio unit 1214 or a functional element therein, (ii) at least one of the I/O interface(s) 1222, (iii) communication unit 1226, or (iv) memory 1234. In addition, one or more application programming interfaces (APIs) (not depicted in FIG. 12) or other types of programming interfaces may permit exchange of information (e.g., streams, data packets, allocation information, data and/or metadata) between two or more functional elements of client device 1210. At least one of such API(s) may be retained or otherwise stored in memory 1234. In certain embodiments, it should be appreciated that at least one of the API(s) or other programming interfaces may permit the exchange of information within components of communication unit 1226. Bus 1242 may permit a similar exchange of information.

Figure 14:
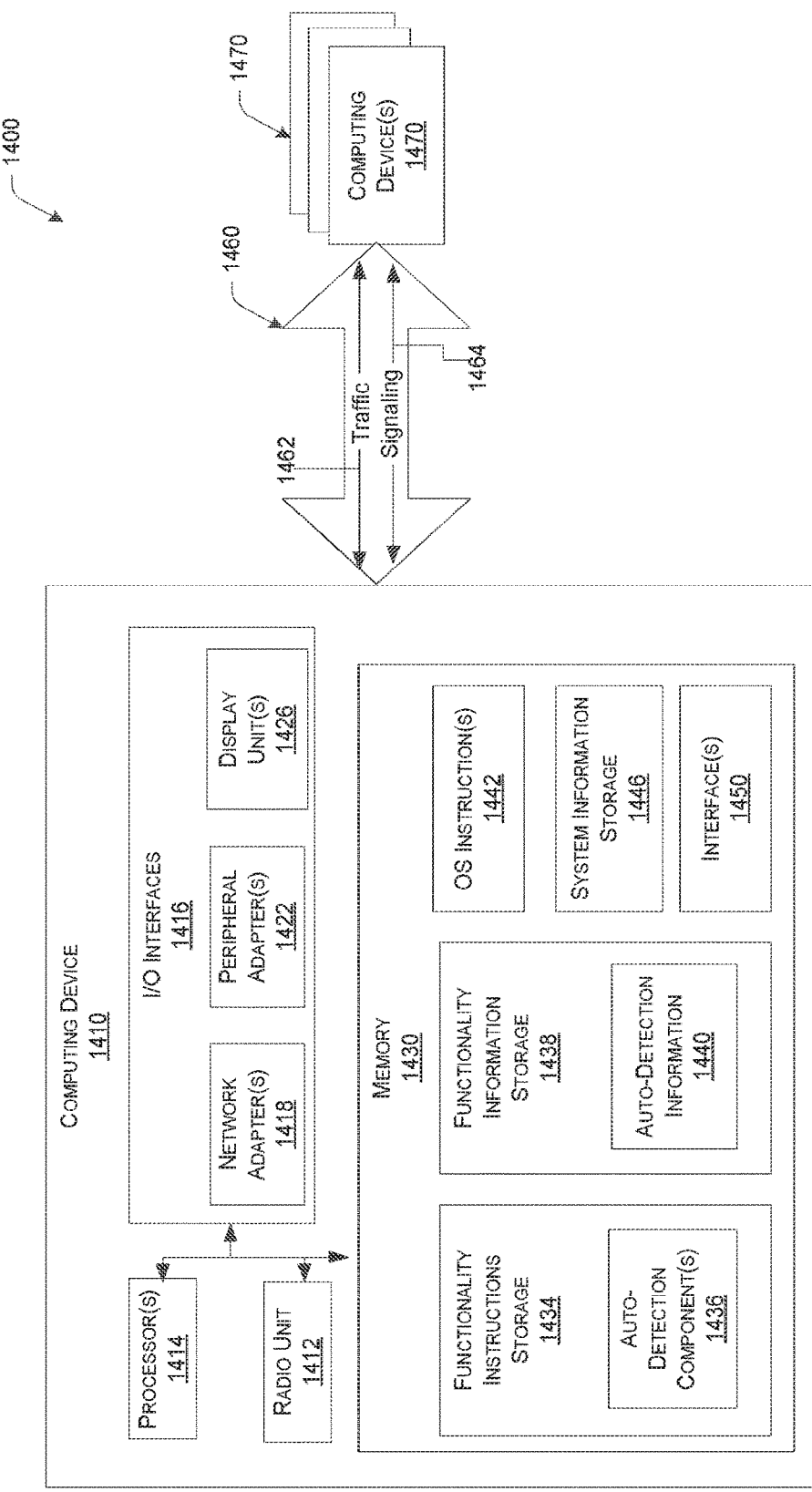
FIG. 14 depicts an example of a computational environment in accordance with one or more exemplary embodiments of the disclosure.

FIG. 14 illustrates an example of computational environment 1400 for auto-detection in accordance with one or more aspects of the disclosure. Computational environment 1400 is only illustrative and is not intended to suggest or otherwise convey any limitation as to the scope of use or functionality of such computational environments' architecture. In addition, computational environment 1400 should not be interpreted as having any dependency or requirement relating to any one or combination of components illustrated in this example computational environment. Illustrative computational environment 1400 may embody or include, for example, computing device 1410, an access point, a user device, and/or any other computing device that may implement or otherwise leverage auto-detection features described herein.

Computational environment 1400 represents an example of a software implementation of the various aspects or features of the disclosure in which the processing or execution of operations described in connection with auto-detection described herein, including processing of information communicated (e.g., encoded, modulated, and/or arranged) in accordance with this disclosure, may be performed in response to execution of one or more software components at computing device 1410. It should be appreciated that the one or more software components can render computing device 1410, or any other computing device containing such components, a particular machine for auto-detection described herein, including processing of information encoded, modulated, and/or arranged in accordance with aspects described herein, among other functional purposes. A software component may be embodied in or may comprise one or more computer-accessible instructions, e.g., computer-readable and/or computer-executable instructions. At least a portion of computer-accessible instructions may embody one or more of the example techniques disclosed herein. For instance, to embody one such method, at least the portion of the computer-accessible instructions may be stored and/or made available in a computer storage non-transitory medium and executed by a processor. The one or more computer-accessible instructions that embody a software component may be assembled into one or more program modules, for example, that may be compiled, linked, and/or executed at computing device 1410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which may be integrated into computing device 1410 or functionally coupled thereto.

The various example embodiments of the disclosure may be operational with numerous other general purpose or special purpose computing system environments or configurations. Examples of well-known computing systems, environments, and/or configurations that may be suitable for implementation of various aspects or features of the disclosure in connection with auto-detection, including processing of information communicated (e.g., encoded, modulated, and/or arranged) in accordance with features described herein, may comprise personal computers; server computers; laptop devices; handheld computing devices, such as mobile tablets; wearable computing devices; and multiprocessor systems. Additional examples may include set top boxes, programmable consumer electronics, network PCs, minicomputers, mainframe computers, blade computers, programmable logic controllers, distributed computing environments that comprise any of the above systems or devices, and the like.

Computing device 1410 may comprise radio unit 1412, processors 1414, input/output (I/O) interfaces 1416, memory 1430, and bus architecture 1432 (also termed bus 1432) that functionally couples various functional elements of computing device 1410. Bus 1432 can include at least one of a system bus, a memory bus, an address bus, or a message bus, and can permit exchange of information (data, metadata, and/or signaling) between processor(s) 1414, I/O interface(s) 1416, and/or memory 1430, or respective functional elements therein. In certain scenarios, bus 1432 in conjunction with internal programming interfaces 1450 (also referred to as interface(s) 1450) may permit such exchange of information. In scenarios in which processor(s) 1414 include multiple processors, computing device 1410 may execute one or more computer-readable instructions to cause the processor to perform the same functions and/or operations that computing device 1410 may perform with a single processor. Radio unit 1412 may comprise components similar to those in radio unit 1214.

I/O interface(s) 1416 may permit or otherwise facilitate communication of information between the computing device and an external device, such as another computing device, e.g., a network element or an end-user device. Such communication can include direct communication or indirect communication, such as exchange of information between computing device 1410 and the external device via a network or elements thereof. As illustrated, I/O interface(s) 1416 may comprise network adapter(s) 1418, peripheral adapter(s) 1422, and display unit(s) 1426. Such adapter(s) may permit or facilitate connectivity between the external device and processor(s) 1414 and/or memory 1430. In one aspect, at least one of the network adapter(s) 1418 may couple functionally computing device 1410 to one or more computing devices 1470 via one or more traffic and signaling pipes 1460 that may permit or facilitate exchange of traffic 1462 and signaling 1464 between computing device 1410 and computing devices 1470. Such network coupling provided at least in part by network adapter(s) 1418 may be implemented in a wired environment, a wireless environment, or both. The information that is communicated by network adapter 1418 may result from implementation of one or more operations in a method of the disclosure. Such output can be any form of visual representation, including, but not limited to, textual, graphical, animation, audio, tactile, and the like. In addition or in the alternative, display unit(s) 1426 may include functional elements (e.g., lights, such as light-emitting diodes; a display, such as liquid crystal display (LCD), combinations thereof, or the like) that may permit control of the operation of the computing device 1410, or may permit conveying or revealing operational conditions of computing device 1410.

In one aspect, bus 1432 may represent one or more of several possible types of bus structures, including a memory bus or memory controller, a peripheral bus, an accelerated graphics port, and a processor or local bus using any of a variety of bus architectures. As an illustration, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. Bus 1432, and all buses described herein may be implemented over a wired or wireless network connection and each of the subsystems, including processor(s) 1414, memory 1430 and memory elements therein, and I/O interface(s) 1416 may be contained within remote computing devices 1470 at physically separate locations, connected through buses of this form, in effect implementing a fully distributed system.

Computing device 1410 may comprise a variety of computer-readable media. Computer readable media can be any available media (non-transitory) that can be accessed by a computing device. In one aspect, computer-readable media can comprise computer non-transitory storage media (or computer-readable non-transitory storage media) and communications media. Example computer-readable non-transitory storage media may be any available media that may be accessed by computing device 1410, and may comprise, for example, both volatile and non-volatile media, and removable and/or non-removable media. In one aspect, memory 1430 may comprise computer-readable media in the form of volatile memory, such as random access memory (RAM), and/or non-volatile memory, such as read only memory (ROM).

Memory 1430 may comprise functionality instructions storage 1434 and functionality information storage 1438. Functionality instructions storage 1434 may comprise computer-accessible instructions that, in response to execution (by at least one of processor(s) 1414), can implement one or more of the functionalities of the disclosure. The computer-accessible instructions can embody or may comprise one or more software components illustrated as auto-detection component(s) 1436. In one scenario, execution of at least one component of auto-detection component(s) 1436 may implement one or more of the techniques disclosed herein. For instance, such execution can cause a processor that executes the at least one component to carry out a disclosed example method. It should be appreciated that, in one aspect, a processor of processor(s) 1414 that executes at least one of auto-detection component(s) 1436 may retrieve information from or retain information in memory element 1440 in functionality information storage 1438 in order to operate in accordance with the functionality programmed or otherwise configured by auto-detection component(s) 1436. Such information can include at least one of code instructions, information structures, or the like. Interfaces 1450 (e.g., application programming interface(s)) may permit or facilitate communication of information between two or more components within functionality instructions storage 1434. The information that is communicated by the at least one interface may result from implementation of one or more operations in a method of the disclosure. In certain embodiments, one or more of functionality instructions storage 1434 and functionality information storage 1438 may be embodied in or can comprise removable/non-removable, and/or volatile/non-volatile computer storage media.

At least a portion of at least one of auto-detection component(s) 1436 or auto-detection information 1440 may program or otherwise configure one or more of processors 1414 to operate at least in accordance with the functionality described herein. Processor(s) 1414 may execute at least one of such components and leverage at least a portion of the information in storage 1438 in order to provide auto-detection in accordance with one or more aspects described herein. More specifically, yet not exclusively, execution of component(s) 1436 may permit transmitting and/or receiving information at computing device 1410, where at least a portion of the information includes one or more streams of data packets and associated physical layer headers, as described in connection with FIGS. 1-11, for example.

It should be appreciated that, in certain scenarios, functionality instruction(s) storage 1434 may embody or comprise a computer-readable non-transitory storage medium having computer-accessible instructions that, in response to execution, cause at least one processor (e.g., processor(s) 1414) to perform a group of operations comprising the operations or blocks described in connection with the disclosed methods.

In addition, memory 1430 may comprise computer-accessible instructions and information (e.g., data and/or metadata) that permit or facilitate operation and/or administration (e.g., upgrades, software installation, any other configuration, or the like) of computing device 1410. Accordingly, as illustrated, memory 1430 may comprise a memory element 1442 (labeled OS instruction(s) 1442) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of computing device 1410 may dictate a suitable OS. Memory 1430 may also comprise system information storage 1446 having data and/or metadata that permits or facilitate operation and/or administration of computing device 1410. Elements of OS instruction(s) 1442 and system information storage 1446 may be accessible or may be operated on by processor(s) 1414.

It should be recognized that while functionality instructions storage 1434 and other executable program components, such as operating system instruction(s) 1442, are illustrated herein as discrete blocks, such software components can reside at various times in different memory components of computing device 1410, and may be executed by processor(s) 1414. In certain scenarios, an implementation of auto-detection component(s) 1436 may be retained on or transmitted across some form of computer readable media.

Computing device 1410 and/or computing device(s) 1470 may include a power supply (not shown), which may power up components or functional elements within such devices. The power supply may be a rechargeable power supply, e.g., a rechargeable battery, and it may include one or more transformers to achieve a power level suitable for operation of computing device 1410 and/or computing device(s) 1470, and components, functional elements, and related circuitry therein.

Computing device 1410 may operate in a networked environment by utilizing connections to remote computing devices 1470. As an illustration, a remote computing device can be a personal computer, a portable computer, a server, a router, a network computer, a peer device or other common network node, and so on. As described herein, connections (physical and/or logical) between computing device 1410 and a computing device of remote computing devices 1470 may be made via one or more traffic and signaling pipes 1460, which may comprise wire line link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 15:
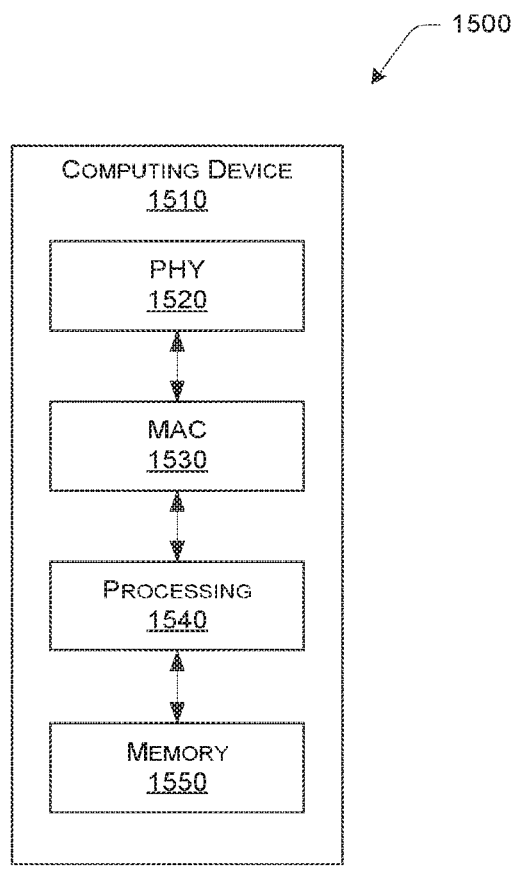
FIG. 15 depicts another example of a communication device in accordance with one or more exemplary embodiments of the disclosure.

FIG. 15 presents another example embodiment 1500 of a computing device (computing device 1510) in accordance with one or more embodiments of the disclosure. In certain implementations, computing device 1510 may be a HEW-compliant device that may be configured to communicate with one or more other HEW devices and/or other types of communication devices, such as legacy communication devices. HEW devices and legacy devices also may be referred to as HEW stations (STAs) and legacy STAs, respectively. In one implementation, computing device 1510 may operate as an access point, a user device, and/or another device. As illustrated, computing device 1510 may include, among other things, physical layer (PHY) circuitry 1520 and medium-access-control layer (MAC) circuitry 1530. In one aspect, the PHY circuitry 1510 and the MAC circuitry 1530 may be HEW compliant layers and also may be compliant with one or more legacy IEEE 802.11 standards. In one aspect, MAC circuitry 1530 may be arranged to configure physical layer converge protocol (PLCP) protocol data units (PPDUs) and arranged to transmit and receive PPDUs, among other things. In addition or in other embodiments, computing device 1510 also may include hardware processing circuitry 1540 (e.g., one or more processors) and memory devices 1550 configured to perform the various operations described herein.

In certain embodiments, MAC circuitry 1530 may be arranged to contend for a wireless medium during a contention period to receive control of the medium for the HEW control period and configure an HEW PPDU. In addition or in other embodiments, PHY 1520 may be arranged to transmit the HEW PPDU. PHY circuitry 1520 may include circuitry for modulation/demodulation, upconversion/downconversion, filtering, amplification, etc. As such, computing device 1510 may include a transceiver to transmit and receive HEW PPDU data. In certain embodiments, hardware processing circuitry 1540 may include one or more processors. Hardware processing circuitry 1540 may be configured to perform functions based on instructions being stored in a memory device (e.g., RAM or ROM) or based on special purpose circuitry. In certain embodiments, hardware processing circuitry 1540 may be configured to perform one or more of the functions described herein, such as allocating bandwidth or receiving allocations of bandwidth.

In certain embodiments, one or more antennas may be coupled to or included in PHY circuitry 1520. The antenna(s) can transmit and receive wireless signals, including transmission of HEW packets. As described herein, the one or more antennas may include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

Memory 1550 may retain or otherwise store information for configuring the other circuitry to perform operations for configuring and transmitting HEW packets and performing the various operations described herein including the allocation of and using of bandwidth (AP) and using the allocation of the bandwidth (STA).

Computing device 1510 may be configured to communicate using OFDM communication signals over a multicarrier communication channel. More specifically, in certain embodiments, computing device 1510 may be configured to communicate in accordance with one or more specific radio technology protocols, such as the IEEE family of standards including IEEE 802.11-2012, IEEE 802.11n-2009, IEEE 802.11ac-2013, IEEE 802.11ax, DensiFi, and/or proposed specifications for WLANs. In one of such embodiments, computing device 1510 may utilize or otherwise rely on symbols having a duration that is four times the symbol duration of IEEE 802.11n and/or IEEE 802.11ac. It should be appreciated that the disclosure is not limited in this respect and, in certain embodiments, computing device 1510 also may transmit and/or receive wireless communications in accordance with other protocols and/or standards.

Computing device 1510 may be embodied in or may constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similar to computing device 1410, computing device 1510 may include, for example, one or more of a keyboard, a display, a non-volatile memory port, multiple antennas, a graphics processor, an application processor, speakers, and other mobile device elements. The display may be an LCD screen including a touch screen.

It should be appreciated that while computing device 1510 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

In example embodiments of the disclosure there may be a wireless communication device, comprising, among other things, at least one memory storing computer-executable instructions; and at least one processor configured to access the at least one memory, wherein the at least one processor is configured to execute the computer-executable instructions to: generate allocation information associated with one or more wireless communication stations; encode the allocation information into a common portion of a physical layer header; and transmit the physical layer header to the one or more wireless communication stations.

Implementations may include one or more of the following features. The wireless communication device may further comprise a transceiver in communication with the at least one processor, wherein the transceiver is configured to transmit and receive wireless signals. The wireless communication device may also comprise one or more antenna coupled to the transceiver one or more input and/or output interfaces; one or more network adapters; one or more peripheral devices; and at least one display unit.

The at least one processor may be further configured to execute the computer-executable instructions to: transmit the physical layer header to the one or more wireless communication stations one or more input and/or output interfaces; one or more network adapters; one or more peripheral devices; and at least one display unit. for respective decoding of the allocation information from the common portion of the physical layer header. The at least one processor may also be further configured to execute the computer-executable instructions to: transmit one or more data packets comprising the physical layer header to the one or more wireless communication stations and the second wireless communication station a plurality of times. The at least one processor may also be further configured to execute the computer-executable instructions to: encode the allocation information into a portion of the physical layer header associated with at least one of the one or more wireless communication stations. The allocation information associated with each of the one or more wireless communication stations is encoded in a codeword. The allocation information comprises bandwidth allocation information. The common portion comprises a user-specific field for each of the one or more wireless communications stations containing the bandwidth allocation information for each of the one or more wireless communications stations. The user-specific fields for each of the one or more wireless communication stations may further comprise one or more user-specific sub-fields wherein one of the user-specific sub-fields contains stream allocation information associated with the corresponding wireless communication station.

In some example embodiments of the disclosure, there may be a non-transitory computer-readable medium including instructions stored thereon, which when executed by at least one processor of a wireless communication device, cause the device to perform operations of: generating allocation information associated with one or more wireless communication stations; encoding the allocation information into a common portion of a physical layer header; and transmitting the physical layer header to the one or more wireless communication stations.

Implementations may include one or more of the following features. The non-transitory computer readable medium may further comprise instructions stored thereon, which when executed by the at least one processor, cause the device to perform operations of: transmitting the physical layer header to the one or more wireless communication stations for respective decoding of the allocation information from the common portion of the physical layer header. The allocation information may comprise bandwidth allocation information. The common portion may comprise a user-specific field for each of the one or more wireless communications stations containing the bandwidth allocation information for each of the one or more wireless communications stations. The encoding of the allocation information into the common portion of the physical layer header may further comprise: dividing a bandwidth into a plurality of resource units (RUs); assigning one of the plurality of RUs to each of one or more of the one or more wireless communication stations; ordering the RUs assigned to each of the one or more of the one or more wireless communications stations from a lowest bandwidth frequency to a highest bandwidth frequency; encoding each RU in the user-specific field corresponding to each of the one or more of the one or more wireless communication stations; and appending a cyclic redundancy check to the common field.

In some example embodiments of the disclosure, there may be a method comprising: generating allocation information associated with one or more wireless communication stations; encoding the allocation information into a common portion of a physical layer header; and transmitting the physical layer header to the one or more wireless communication stations. Implementations may include one or more of the following features. The allocation information comprises bandwidth allocation information. The common portion of the physical layer header may have a fixed length and may be based at least in part on a total bandwidth. The bandwidth allocation information may be based at least in part on the total bandwidth. The bandwidth allocation information may correspond to an eight bit field associated with a twenty Megahertz (MHz) channel. The common portion may comprise a user-specific field for each of the one or more wireless communications stations containing the bandwidth allocation information for each of the one or more wireless communications stations. The encoding the allocation information for each of the one or more wireless communication stations into the common portion of the physical layer header may further comprise: appending a cyclic redundancy check (CRC) to each of the user-specific fields; appending a CRC to the common portion of the physical layer header; and appending one or more user-specific fields after the common portion of the physical layer header based at least in part on the number of wireless communication stations exceeding a predetermined number. The predetermined number may be at least three.

In some example embodiments of the disclosure, there may be a wireless communication device comprising: a means for generating allocation information associated with one or more wireless communication stations; a means for encoding the allocation information into a common portion of a physical layer header; and a means for transmitting the physical layer header to the one or more wireless communication stations.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that may perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for determining a resource unit allocation, the device comprising storage and processing circuitry configured to:
determine the resource unit allocation for a first user device of one or more user devices, wherein the resource unit allocation comprises an indication of a bandwidth for the first user device, and the first user device is an individual first user device, wherein the resource unit allocation is a first resource unit allocation, wherein the bandwidth is a first bandwidth;
determine a second resource unit allocation for a second user device, and wherein the second resource unit allocation comprises an indication of a second bandwidth for the second user device, and the second user device is an individual second user device;
determine a user field of a signal field of a high efficiency wireless (HEW) frame, wherein the user field comprises an indication of a station device (STA) identifier of the first user device, an indication of a modulation and coding scheme (MCS) for the first user device, and an indication of a stream allocated to the first user device;
encode the resource unit allocation into a common field of the signal field;
encode the user field into the signal field, wherein the user field is separate from the common field; and
cause to send the HEW frame.

2. The device of claim 1, wherein the user field is a first user field, wherein the STA identifier is a first STA identifier, wherein the MCS is a first MCS, wherein the stream allocated to the first user device is a first stream, wherein the storage and processing circuitry are further configured to determine a second user field of the signal field, wherein the second user field comprises an indication of a second STA identifier of a second user device, and an indication of a second MCS for the second user device, and an indication of a second stream allocated to the second user device, wherein the second user device is an individual second user device.

3. The device of claim 1, wherein to encode the user field comprises the storage and processing circuitry being configured to encode the user field into a user block of the signal field.

4. The device of claim 1, wherein the user field is a first user field of one or more user fields, wherein the one or more user fields comprise a second user field, wherein to encode the first user field comprises the storage and processing circuitry being configured to encode the first user field into a first user block of the signal field, and wherein the storage and processing circuitry are further configured to encode the second user field into a second user block of the signal field.

5. The device of claim 4, wherein the STA identifier is a first STA identifier, wherein the MCS is a first MCS, wherein the stream is a first stream, wherein the second user field comprises an indication of a second STA identifier associated with a second user device, wherein the second user field further comprises an indication of a second MCS for the second user device and an indication of a second stream allocated to the second user device, and wherein the storage and processing circuitry are further configured to determine the second user field.

6. The device of claim 1, wherein the resource unit allocation is associated with a multiuser multiple input, multiple output (MU-MIMO) allocation.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
- identifying, by a first user device, a high efficiency wireless (HEW) frame received from an access point device;
- decoding a common field of a signal field of the HEW frame, wherein the common field comprises a resource unit allocation for the first user device, wherein the resource unit allocation comprises an indication of a bandwidth for the first user device, and the first user device is an individual first user device;
- decoding a user field of the signal field, wherein the user field comprises an indication of a station device (STA) identifier of the first user device, an indication of a modulation and coding scheme (MCS) for the first user device, and an indication of a stream allocated to the first user device; and
- determining that the resource unit allocation is for the first user device, wherein the resource unit allocation is a first resource unit allocation, wherein the bandwidth is a first bandwidth, wherein decoding the common field comprises identifying a second resource unit allocation for a second user device, and wherein the second resource unit allocation comprises an indication of a second bandwidth for the second user device, and the second user device is an individual second user device.

10. The non-transitory computer-readable medium of claim 9, wherein determining that the resource unit allocation is for the first user device comprises determining that the user field is assigned to the resource unit allocation.

11. The non-transitory computer-readable medium of claim 9, wherein the user field is a first user field, wherein the STA identifier is a first STA identifier, wherein the MCS is a first MCS, the operations further comprising identifying a second user field of the signal field, wherein the second user field comprises an indication of a second STA identifier of a second user device, an indication of a second MCS for the second user device, and an indication of a second stream allocated to the second user device, and the second user device is an individual second user device.

12. The non-transitory computer-readable medium of claim 9, wherein decoding the user field comprises decoding a user block of the signal field.

13. The non-transitory computer-readable medium of claim 9, wherein the user field is a first user field of one or more user fields, wherein the one or more user fields comprise a second user field, wherein decoding the first user field comprises decoding a first user block of the signal field, the operations further comprising decoding a second user block of the signal field, wherein the second user block is associated with the second user field.

14. A method for determining a resource unit allocation, the method comprising:
- determining, by one or more processors of an access point device, the resource unit allocation for a first user device of one or more user devices, wherein the resource unit allocation comprises an indication of a bandwidth for the first user device, and the first user device is an individual first user device, wherein the resource unit allocation is a first resource unit allocation, wherein the bandwidth is a first bandwidth;
- determining a second resource unit allocation for a second user device, and wherein the second resource unit allocation comprises an indication of a second bandwidth for the second user device, and the second user device is an individual second user device;
- determining, by the one or more processors, a user field of a signal field of a high efficiency wireless (HEW) frame, wherein the user field comprises an indication of a station device (STA) identifier of the first user device, an indication of a modulation and coding scheme (MCS) for the first user device, and an indication of a stream allocated to the first user device;
- encoding, by the one or more processors, the resource unit allocation into a common field of the signal field;
- encoding, by the one or more processors, the user field into the signal field, wherein the user field is separate from the common field; and
- causing to send, by the one or more processors, the HEW frame.

15. The method of claim 14, wherein the user field is a first user field, wherein the STA identifier is a first STA identifier, wherein the MCS is a first MCS, the method further comprising determining a second user field of the signal field, wherein the second user field comprises an indication of a second STA identifier of the second user device, an indication of a second MCS for the second user device, and an indication of a second stream allocated to the second user device.

16. The method of claim 14, wherein encoding the user field comprises encoding the user field into a user block of the signal field.

17. The method of claim 14, further comprising encoding the second user field into a second user block of the signal field, wherein:
- the user field is a first user field of one or more user fields,
- the one or more user fields comprise a second user field, and
- encoding the first user field comprises encoding the first user field into a first user block of the signal field.

* * * * *